United States Patent
Kimura

(10) Patent No.: US 11,745,526 B2
(45) Date of Patent: Sep. 5, 2023

(54) PRINTING APPARATUS, READING METHOD, AND PROGRAM

(71) Applicant: FUJIFILM Corporation, Tokyo (JP)

(72) Inventor: Yosuke Kimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 146 days.

(21) Appl. No.: 17/363,825

(22) Filed: Jun. 30, 2021

(65) Prior Publication Data

US 2021/0323329 A1    Oct. 21, 2021

Related U.S. Application Data

(63) Continuation of application No. PCT/JP2020/002948, filed on Jan. 28, 2020.

(30) Foreign Application Priority Data

Feb. 1, 2019   (JP) ................. 2019-017214

(51) Int. Cl.
    *B41J 29/393*    (2006.01)
(52) U.S. Cl.
    CPC .................. *B41J 29/393* (2013.01)
(58) Field of Classification Search
    CPC .... B41J 29/393; B41J 2/0451; B41J 2/16579; B41J 2203/01; B41J 2203/011;
    (Continued)

(56) References Cited

U.S. PATENT DOCUMENTS

| 2004/0175033 A1 | 9/2004 | Matama |
| 2005/0040348 A1 | 2/2005 | Soar |
| 2016/0286069 A1 | 9/2016 | Kubo et al. |

FOREIGN PATENT DOCUMENTS

| JP | 2003-341030 A | 12/2003 |
| JP | 2004-338199 A | 12/2004 |

(Continued)

OTHER PUBLICATIONS

Extended European Search Report dated Feb. 14, 2022 in Application No. 20749227.3.

(Continued)

*Primary Examiner* — Julian D Huffman
(74) *Attorney, Agent, or Firm* — Sughrue Mion, PLLC

(57) ABSTRACT

Provided are a printing apparatus, a reading method, and a program capable of stably acquiring a high-quality read image. Provided are a printing section (102) that performs printing on a transparent base material to generate a printed matter; a reading section (40) that is disposed on one surface side of the base material and reads reflected light or transmitted light; an illumination section (122) including a reflective illumination part (122) that is disposed on the one surface side of the base material and irradiates the base material with illumination light and a transmissive illumination part (124) that is disposed on the other surface side of the base material and irradiates the base material with illumination light; an inspection information acquisition section (120) that acquires inspection information on an inspection performed on the printed matter; and an illumination control section (120) that selectively controls at least one of the reflective illumination part or the transmissive illumination part on the basis of the inspection information.

12 Claims, 15 Drawing Sheets

(58) Field of Classification Search
CPC ..... B41J 11/003; B41J 11/009; B41J 11/0095; G01N 33/34; G01N 33/343; G01N 33/346; G01N 2021/8663; G03G 15/0029; G03G 2215/00717
See application file for complete search history.

(56) References Cited

FOREIGN PATENT DOCUMENTS

| | | |
|---|---|---|
| JP | 2005-191737 A | 7/2005 |
| JP | 2006-110952 A | 4/2006 |
| JP | 2008-087287 A | 4/2008 |
| JP | 2014-113692 A | 6/2014 |
| JP | 2016-182754 A | 10/2016 |
| JP | 2016-198899 A | 12/2016 |
| JP | 6179280 B2 | 8/2017 |
| JP | 2017-216197 A | 12/2017 |

OTHER PUBLICATIONS

International Search Report dated Apr. 14, 2020 in International Application No. PCT/JP2020/002948.
International Preliminary Report on Patentability dated Jul. 27, 2021 in International Application No. PCT/JP2020/002948.
Written Opinion of the International Searching Authority dated Apr. 14, 2020 in International Application No. PCT/JP2020/002948.

PRINTING APPARATUS, READING METHOD, AND PROGRAM

CROSS-REFERENCE TO RELATED APPLICATIONS

The present application is a Continuation of PCT International Application No. PCT/JP2020/002948 filed on Jan. 28, 2020 claiming priority under 35 U.S.C. § 119(a) to Japanese Patent Application No. 2019-017214 filed on Feb. 1, 2019. Each of the above applications is hereby expressly incorporated by reference, in its entirety, into the present application.

BACKGROUND OF THE INVENTION

1. Field of the Invention

The present invention relates to a printing apparatus, a reading method, and a program, and particularly to reading a printed matter.

2. Description of the Related Art

Examples of printing to a base material other than paper include printing to soft packaging used for food packaging and the like. Soft packaging is a packaging material made of a flexible material. Examples of the material of the soft packaging include plastic films, paper, aluminum foil, and the like. The soft packaging may have an aspect in which a flexible thin material is used alone or an aspect in which the flexible thin material is used by bonding.

In order to improve the quality of the printed matter, inspection of the printed matter, correction of printing based on an inspection result, and the like are necessary. JP2016-198899A describes an ink jet recording apparatus capable of performing different types of inspections with high accuracy. The apparatus described in the same document comprises an image reading device disposed on a transport path of a base material. The image reading device receives the reflected light of the illumination light with which the printed matter is irradiated. An inspection section performs inspection of defective nozzles and correction of density unevenness on the basis of the reading result of the image reading device.

In a case where the base material of the printed matter is transparent, the background of the base material will be seen through using a reflective reading system that reads the reflected light of the illumination light with which the base material is irradiated. Then, in a case where the inspection of the printed matter is performed, a stable and high-quality read image may not be obtained.

As a countermeasure against such as problem, by using a member of white or the like in a background region during reading regarding color inks such as cyan, magenta, yellow, and black, it is possible to stably obtain a read image of the same quality as that in a case where an opaque base material such as paper read.

Additionally, as a system that reads a printed matter to which a transparent base material is applied, it is possible to adopt a transmissive reading system in which illumination light is radiated from a side opposite to the base material toward a reading device that reads the printed matter, and the reading device is used to read the transmitted light transmitted through the base material.

JP2016-198899A describes an image reading device including a reflected light source that radiates light from a front surface side of a printed matter and a transmitted light source that radiates light from a back surface side of the printed matter. The device described in the same document is configured such that the reflected light source is used to guide the reflected light of the read material to a line sensor in a case where the read material is an opaque material and the transmitted light source is used to guide the transmitted light of the read material to the line sensor in a case where the read material is a transparent material.

JP2008-87287A describes an image forming apparatus including a transmissive measurement unit and a reflective measurement unit. The apparatus described in the same document uses the measurement result of the transmissive measurement unit and the measurement result of the reflective measurement unit to specify the position of a nozzle with poor ink jetting and the color of ink with poor jetting in a case where white ink is overlapped on a transparent base material, which is printed with colored ink.

SUMMARY OF THE INVENTION

However, in the inspection of the printed matter using the transparent base material, in a case where the reflective reading system is applied, the background color of the read image becomes blackish as a result of a relatively small light amount of reflected light directed to an image sensor. Then, in a case where the inspection of a nozzle state is performed, it is difficult to determine the quality of an inspection pattern from the read image.

Additionally, in a case where the transmissive reading system is applied, it is possible to detect various changes in an image to be read such as gloss unevenness and density unevenness. However, in a case where the inspection of the density unevenness is performed, there is a possibility that the read image may contain various changes other than the density unevenness.

Then, in a case where the inspection is performed on the basis of the read image and the density unevenness correction is performed depending on an inspection result, an appropriate correction may not be performed. That is, it is desired to comprise an appropriate printed matter reading system for each printed matter inspection and to select an appropriate printed matter reading system for each printed matter inspection.

JP2016-198899A discloses a system that reads the reflected light using the image reading device but does not disclose a system other than the system that reads the reflected light. Additionally, JP2016-198899A does not disclose the reading of the printed matter to which the transparent base material is applied.

JP2016-198899A discloses that the transmitted light source and the reflected light source are selectively switched depending on whether the read material is the transparent material or the opaque material, but does not disclose selecting an appropriate light source for each inspection of the printed matter.

JP2008-87287A discloses specifying the position of a nozzle with poor ink jetting and the ink color using both the transmissive measurement unit and the reflective measurement unit are disclosed, but does not disclose selectively applying the transmissive measurement unit or the reflective measurement unit depending on the inspection of printed matter.

The present invention has been made in view of such circumstances, and an object of the present invention is to provide a printing apparatus, a reading method, and a program capable of stably acquiring a high-quality read image.

In order to achieve the above object, the following invention aspects are provided.

A printing apparatus according to a first aspect is a printing apparatus comprising a printing section that performs printing on a transparent base material to generate a printed matter; an illumination section including a reflective illumination part that is disposed on one surface side of the base material and irradiates the base material with illumination light and a transmissive illumination part that is disposed on the other surface side of the base material and irradiates the base material with illumination light; a reading section that is disposed on the one surface side of the base material and reads reflected light of the base material or transmitted light of the base material; an inspection information acquisition section that acquires inspection information on an inspection performed on the printed matter; and an illumination control section that selectively controls at least one of the reflective illumination part or the transmissive illumination part on the basis of the inspection information acquired by using the inspection information acquisition section.

According to the first aspect, the reflective illumination part and the transmissive illumination part are selectively controlled on the basis of the inspection information on the inspection of the printed matter. Accordingly, a high-quality read image can be stably acquired.

The transparent base material means a base material having a specified transmittance. Visible light transmittance may be applied as the transmittance.

Examples of the base material include media referred to as films and sheets. The form of the base material may be either a single-wafer form cut to a specified length or a roll-to-roll continuous form.

An aspect including an ink jet head may be applied as the printing section. An aspect including one or more ink jet heads for each ink color may be applied as the printing section.

The printing apparatus may comprise a transport section that supports and transports the base material.

The printing apparatus may comprise an inspection section that performs the inspection of the printed matter on the basis of the read image.

In a second aspect based on the printing apparatus of the first aspect, the illumination control section may be configured to perform a control using at least the transmissive illumination part in a case where the inspection information indicating that a printing element abnormality inspection is performed is acquired.

According to the second aspect, the transmissive illumination part is applied to read the printed matter in a case where the printing element abnormality inspection is performed. Accordingly, a high-quality read image of the printed matter on which a test pattern or the like is printed can be stably acquired.

Examples of the printing element include a nozzle portion provided in the ink jet head and a light emitting element provided in the electrophotographic printing section.

An aspect comprising an abnormality correction unit that performs correction of the printing on the basis of the inspection result of the printing element abnormality inspection is preferable.

In a third aspect based on the printing apparatus of the first aspect or the second aspect, the illumination control section may be configured to perform a control using at least the reflective illumination part in a case where the inspection information indicating that a printing unevenness inspection is performed is acquired.

According to the third aspect, the reflective illumination part is applied to read the printed matter in a case where the printing unevenness inspection is performed. Accordingly, a high-quality read image of the printed matter on which a test pattern or the like is printed can be stably acquired.

An aspect comprising a printing unevenness correction section that performs correction of the printing on the basis of the inspection result of the printing unevenness inspection is preferable.

The correction of the printing unevenness may include at least one of correction of density unevenness or color correction.

In a fourth aspect based on the printing apparatus of any one of the first to third aspects, the illumination control section may be configured to control emission intensities of the reflective illumination part and the transmissive illumination part.

According to the fourth aspect, the reading of the printed matter to which appropriate emission intensities of the reflective illumination part and the transmissive illumination part are applied may be performed.

A fifth aspect based on the printing apparatus of any one of the first to fourth aspects may further comprise a printing information acquisition section that acquires printing information on printing from a higher-level system, and the illumination control section may be configured to control the illumination section on the basis of the printing information.

According to the fifth aspect, the control of the illumination section suitable for reading the printed matter may be performed on the basis of the printing information.

In a sixth aspect based on the printing apparatus of the fifth aspect, the printing information acquisition section may be configured to acquire information on a color used for printing as the printing information.

According to the sixth aspect, the control of the illumination section suitable for reading the printed matter may be performed on the basis of the information of a color used for printing.

A seventh aspect based on the printing apparatus of any one of the first to sixth aspects may be comprise a reading reference data creation section that reads a reference surface by using the reading section and creates reading reference data for the reading section; a reference correction data creation section that creates reference correction data to be used in a case where a read image is corrected using the reading reference data; and a reference correction data storage section that stores the reference correction data, the reference correction data creation section may be configured to create reflection reference correction data that is the reference correction data in a case where the reflective illumination part is used, and transmission reference correction data that is the reference correction data in a case where the transmissive illumination part is used, and the reference correction data storage section may be configured to store the reflection reference correction data and the transmission reference correction data.

According to the seventh aspect, the characteristics of the reflective illumination part can be corrected in a case where the printed matter is read using the reflective illumination part. Additionally, the characteristics of the transmissive illumination part can be corrected in a case where the printed matter is read using the transmissive illumination part.

In an eighth aspect based on the printing apparatus of any one of the first to seventh aspects, a sheet illumination provided on a surface that supports the base material in a case where the base material is transported may be configured to be applied to the transmissive illumination part.

According to the eighth aspect, the reflective illumination part and the transmissive illumination part can be automatically switched.

In a ninth aspect based on the printing apparatus of the eighth aspect, a color of the surface that supports the base material in a case where the sheet illumination is turned off may be configured to be a whitish color.

According to the ninth aspect, in a case where the sheet illumination is turned off, the sheet illumination can be used as a background of the transparent base material.

The whitish color is a concept including white and a color that can function as a background for the transparent base material similarly to white. An example of the whitish color includes gray.

A reading method according to a tenth aspect is a reading method comprising a printing step of performing printing on a transparent base material to generate printed matter; an illumination step of irradiating the base material with illumination light by using a reflective illumination part disposed on one surface side of the base material and a transmissive illumination part disposed on the other surface side of the base material; a reading step of reading reflected light of the base material or transmitted light of the base material by using the reading section disposed on the one surface side of the base material; and an inspection information acquisition step of acquiring inspection information on an inspection performed on the printed matter, the illumination step irradiates the base material with illumination light by selectively using at least one of the reflective illumination part or the transmissive illumination part on the basis of the inspection information acquired in the inspection information acquisition step.

According to the tenth aspect, the same effects as those of the first aspect can be obtained.

In the tenth aspect, the same items as the items specified in the second to ninth aspects can be appropriately combined together. In that case, the components that carry the processing and functions specified in the printing apparatus can be grasped as the components of the reading method that carry the corresponding processing and functions.

A program according to an eleventh aspect is a program for causing a computer to realize a printing function of performing printing on a transparent base material to generate a printed matter; an illumination function of irradiating the base material with illumination light by using at least one of a reflective illumination part disposed on one surface side of the base material or a transmissive illumination part disposed on the other surface side of the base material; a reading function of reading reflected light of the base material or transmitted light of the base material by using the reading section disposed on the one surface side of the base material; and an inspection information acquisition function of acquiring inspection information on an inspection performed on the printed matter, and the illumination function irradiates the base material with illumination light by selectively using at least one of the reflective illumination part or the transmissive illumination part on the basis of the inspection information acquired using the inspection information acquisition function.

According to the eleventh aspect, the same effects as those of the first aspect can be obtained.

In the eleventh aspect, the same items as the items specified in the second to ninth aspects can be appropriately combined together. In that case, the components that carry the processing and functions specified in the printing apparatus can be grasped as the components of the program that carry the corresponding processing and functions.

According to the present invention, the reflective illumination part and the transmissive illumination part are selectively controlled on the basis of the inspection information on the inspection of the printed matter. Accordingly, a high-quality read image can be stably acquired.

DESCRIPTION OF THE PREFERRED EMBODIMENTS

Hereinafter, preferred embodiments of the present invention will be described in detail with reference to the accompanying drawings. In the present specification, the same components will be denoted by the same reference signs, and overlapping descriptions thereof will be appropriately omitted.

[Ink Jet Printing Apparatus]

[Overall Configuration]

Figure 1:
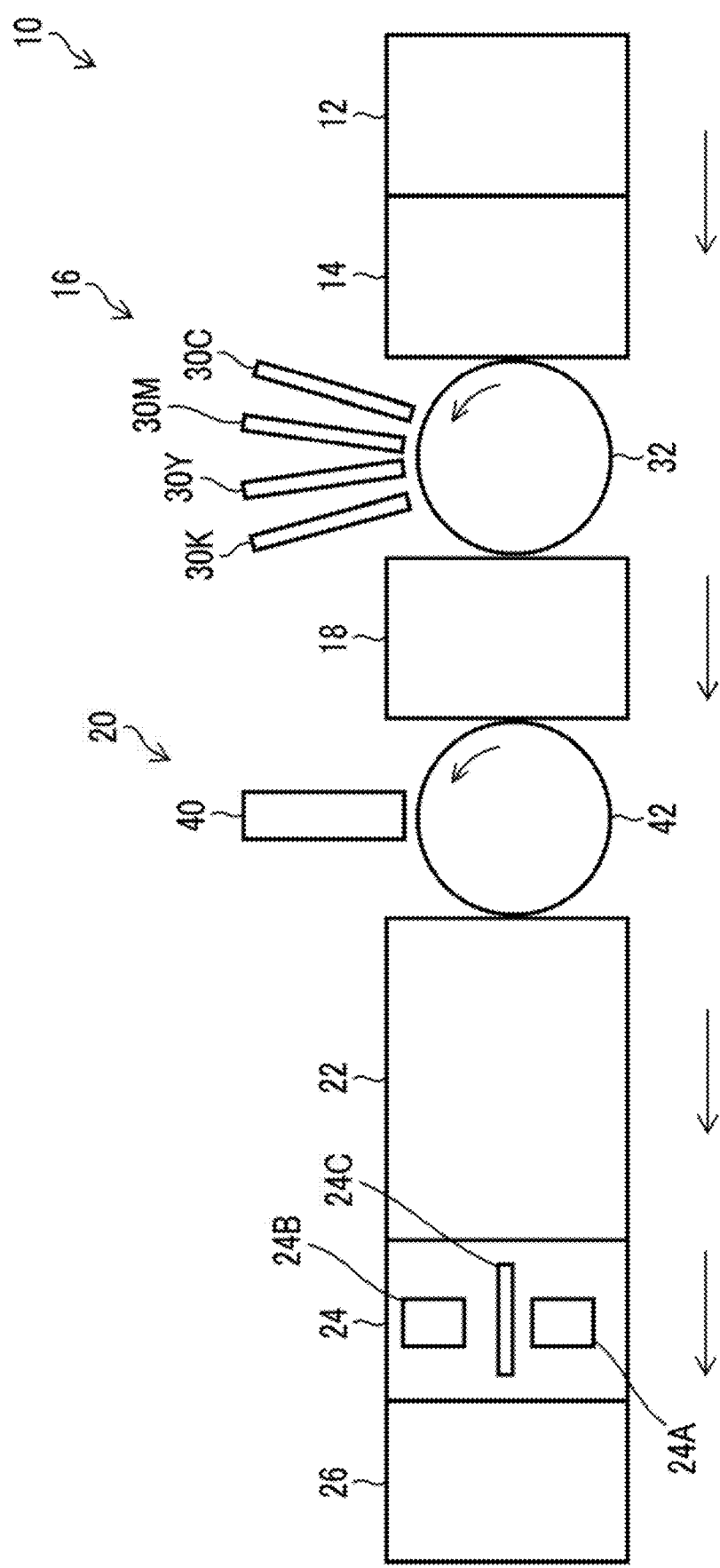
FIG. 1 is an overall configuration diagram of an ink jet printing apparatus.

FIG. 1 is an overall configuration diagram of an ink jet printing apparatus. The ink jet printing apparatus 10 is a digital printing apparatus that prints an image on a transparent base material using a single-pass type ink jet head. In the present embodiment, soft packaging such as a plastic film is exemplified as the base material. The base material may be a single layer, or a plurality of layers may be superimposed on each other. The base material may be in a roll-to-roll continuous form or in a single-wafer form cut to a specified length.

As the transparent base material, a base material having a visible light transmittance of 10 percent or more may be applied. As the visible light transmittance, a measurement result based on a method of obtaining the total light transmittance in a visible region of a plate-shaped or film-shaped plastic, which is transparent, translucent, or opaque, as defined in JIS7375 (2008) may be applied.

As the visible light transmittance, a measurement value measured using a transmittance determination device TLV-304-BP manufactured by Asahi Spectra Co., Ltd. may be applied. A bandpass filter of the device can be set depending on the wavelength range of a light source. In addition, there is a case where the base material is referred to as a medium, media, a sheet, a film, a substrate, or the like.

The ink jet printing apparatus 10 comprises a base material supply section 12, a first intermediate transport part 14, a printing section 16, a second intermediate transport part 18, a reading section 20, a drying section 22, an inspection section 24, and a stacking section 26. The ink jet printing apparatus 10 comprises a maintenance system. In addition, illustration of the maintenance system is omitted in FIG. 1. Hereinafter, respective sections will be described in detail.

[Base Material Supply Section]

The base material supply section 12 houses the base material. In a case where the base material is in a continuous form, the base material supply section 12 comprises a roll housing unit that houses a roll around which the base material is wound. In a case where the base material is in a single-wafer form, the base material supply section 12 comprises a tray in which the base material is housed. The base material supply section 12 supplies the base material to the first intermediate transport part 14 in response to the printing control of the printing section 16. The base material supply section 12 may comprise a correction mechanism that corrects the posture of the base material.

[First Intermediate Transport Part]

The first intermediate transport part 14 transfers the base material supplied from the base material supply section 12 to the printing section 16. A known configuration according to the form of the base material may be applied to the first intermediate transport part 14. In addition, an arrow line from the base material supply section 12 to the first intermediate transport part 14 indicates a transport direction of the base material.

[Printing Section]

The printing section 16 comprises an ink jet head 30C, an ink jet head 30M, an ink jet head 30Y, an ink jet head 30K, and an inkjet head 30W. The ink jet head 30C, the ink jet head 30M, the ink jet head 30Y, the ink jet head 30K, and the ink jet head 30W are disposed in the order of the ink jet head 30C, the ink jet head 30M, the ink jet head 30Y, and the ink jet head 30K, and the ink jet head 30W from an upstream side in the transport direction of the base material.

The ink jet head 30C jets cyan ink. The ink jet head 30M jets magenta ink. The ink jet head 30Y jets yellow ink. The ink jet head 30K jets black ink. The ink jet head 30W jets white ink.

The printing section 16 comprises a printing drum 32. The printing drum 32 has a cylindrical shape. The printing drum 32 comprises a base material support region that supports the base material on a peripheral surface thereof. In addition, illustration of the base material support region is omitted.

A rotation shaft of the printing drum 32 is connected to a motor (not shown) via a drive mechanism (not shown). In a case where the motor is rotated, the printing drum 32 rotates in a direction indicated by an arrow line. In a case where the printing drum 32 is rotated, the base material supported on the peripheral surface of the printing drum 32 is transported in a rotational direction of the printing drum 32.

A plurality of suction holes are formed in the base material support region. The plurality of suction holes are disposed on the basis of a specified pattern. The plurality of suction holes communicate with a suction flow channel (not shown). The suction flow channel is connected to a suction pump (not shown). By operating the suction pump to generate negative pressure in the plurality of suction holes, the base material is suction-supported on the peripheral surface of the printing drum 32.

The transport mode of the base material in the printing section 16 is not limited to the transport mode using the printing drum 32. For example, a transport mode using a transport belt and a transport mode using a plurality of rollers may be applied.

[Second Intermediate Transport Part]

The second intermediate transport part 18 transfers the base material transferred from the printing drum 32 to the reading section 20. As the second intermediate transport part 18, the same configuration as the first intermediate transport part 14 may be applied. In addition, an arrow line shown in the second intermediate transport part 18 indicates the transport direction of the base material in the second intermediate transport part 18.

[Reading Section]

The reading section 20 comprises an imaging unit 40, a reading drum 42, a reflective illumination (not shown in FIG. 1), and a transmissive illumination (not shown in FIG. 1). A line sensor in which a plurality of reading elements are arranged on the basis of a specified arrangement is applied to the imaging unit 40.

As the imaging unit 40, a line sensor in which a plurality of reading elements are arranged in a line over a length corresponding to the entire width of the base material in a width direction of the base material may be applied. In the imaging unit 40, a plurality of line sensors may be disposed in a zigzag manner, and a configuration corresponding to the entire width of the base material may be applied in the width direction of the base material.

As the imaging unit 40, a line sensor in which a plurality of reading elements are arranged over a length less than the entire width of the base material may be applied, and the imaging unit 40 may move relative to the base material in the width direction of the base material and may perform the reading of the entire width of the base material in the width direction of the base material. Such a configuration comprises a relative movement unit for moving at least one of the imaging unit 40 or the base material.

Here, the width direction of the base material is a direction orthogonal to the transport direction of the base material and parallel to a printing target surface of the base material. The term "orthogonal" in the present specification may include "being substantially orthogonal" in which the same operational effects as those in a case where two directions intersect at 90 degrees can be obtained even in a case where two directions intersect each other at an angle of less than 90 degrees or more than 90 degrees.

Additionally, the term "parallel" in the present specification may include "being substantially parallel" in which the same operational effects as those in the case where two directions are parallel can be obtained even in a case where the two directions intersect each other.

As the reading elements, CCD image sensors may be applied or CMOS image sensors may be applied. In addition, CCD is an abbreviation for Charge-Coupled Device. Additionally, CMOS is an abbreviation for Complementary Metal Oxide Semiconductor.

The reading drum 42 has a cylindrical shape. The reading drum 42 comprises a base material support region that supports the base material on a peripheral surface thereof. In addition, illustration of the base material support region is omitted. The reading drum 42 supports and transports the printed base material transferred from the second intermediate transport part 18.

The rotation shaft of the reading drum 42 is coupled to a motor (not shown) via a drive mechanism (not shown). In a case where the motor is rotated in a specified rotational direction, the reading drum 42 rotates in the direction indicated by the arrow line. In a case where the reading drum 42 is rotated, the base material supported on the peripheral surface of the reading drum 42 is transported in the rotational direction of the reading drum 42.

The described transport mode in the reading section 20 is not limited to the transport mode using the reading drum 42. For example, a transport mode using a transport belt and a transport mode using a plurality of rollers may be applied.

[Drying Section]

The drying section 22 performs a drying treatment on the printed base material. The drying section 22 comprises a heater and a fan, and a configuration in which warm air is blown onto the printed base material may be applied as the drying section 22. The drying section 22 comprises a drying transport part that transports the base material. As the transport mode of the base material, known transport modes such as drum transport, belt transport, and roller transport may be applied. In addition, an arrow line shown in the drying section 22 indicates the transport direction of the base material in the drying section 22.

The drying section 22 may comprise a posture changing unit that changes the posture of the base material. Examples of changing the posture of the base material include an aspect in which a laid state is changed to an upright state and an aspect in which the horizontal transport of the base material is changed to the vertical transport thereof

[Inspection Section]

The inspection section 24 performs the inspection of the drying-treated printed matter transferred from the drying section 22. In addition, the inspection section 24 comprises a reading device 24A and an illumination device 24B. The reading device 24A is disposed at a position on a back surface side of a printed matter 24C. The illumination device 24B is disposed at a position on a front surface side of the printed matter 24C.

The inspection section 24 radiates illumination light from the back surface side of the printed matter 24C, receives the transmitted light of the printed matter 24C, and generates a read image of the printed matter 24C. In the inspection of the printed matter 24C, the determination of the quality of the printed matter 24C is performed on the basis of the read image.

That is, in the inspection of the printed matter 24C, the presence or absence of a printing defect, the presence or absence of a scratch, and appropriateness of color in the printed matter 24C are determined. An arrow line shown in the inspection section 24 indicates the transport direction of the base material in the inspection section 24. In addition, the printed matter 24C shown in FIG. 1 represents a printed base material on which an image is formed by using the printing section 16.

The inspection section 24 shown in the present embodiment performs the inspection of the printed matter 24C in which an image is formed on a transparent base material by using color ink, and a background is formed by using white ink overlapping on the image formed by using the color ink.

That is, the inspection section 24 can perform the inspection of the printed matter 24C in which an image using the color ink can be visually recognized from the side of a non-printing surface of the base material, and a white background can be visually recognized in a case where viewed from the side of the printing surface of the base material.

In addition, the configuration of the inspection section 24 shown in FIG. 1 is determined depending on the configuration of the printed matter 24C. For example, configuration examples of the inspection section 24 include an aspect in which the dispositions of the reading device 24A and the illumination device 24B can be switched therebetween, and an aspect in which the reading device 24A and the illumination device 24B are disposed on the printing surface side of the printed matter 24C.

[Stacking Section]

The stacking section 26 houses the printed matter 24C transferred from the inspection section 24. In a case where the base material is in a continuous form, the stacking section 26 comprises a roll housing unit that houses a roll around which the printed matter 24C is wound. In a case where the base material is in a single-wafer form, the stacking section 26 comprises a tray in which the printed matter 24C is housed.

In the present embodiment, an aspect in which the printing drum 32 is applied to the transport of the base material in the printing section 16 has been exemplified. However, any method such as belt transport and roller transport may be applied to the transport of the base material in the printing section 16. The same applies to the transport of the base material in the reading section 20.

[Description of Functional Block]

Figure 2:
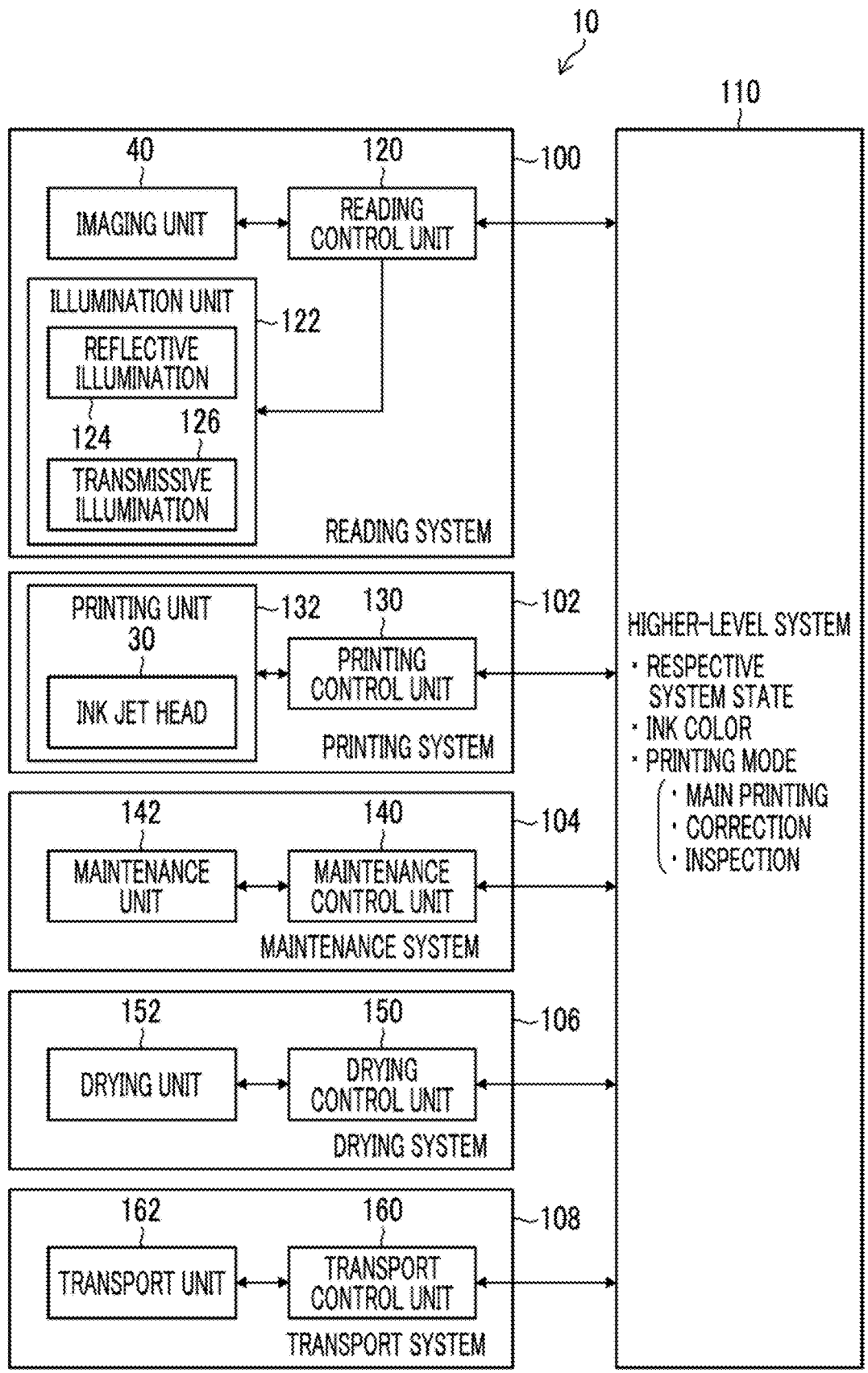
FIG. 2 is a functional block diagram of the ink jet printing apparatus

FIG. 2 is a functional block diagram of the ink jet printing apparatus. The ink jet printing apparatus 10 comprises a reading system 100, a printing system 102, a maintenance system 104, a drying system 106, and a transport system 108.

[Reading System]

The reading system 100 comprises a reading control unit 120, the imaging unit 40, and an illumination unit 122. The illumination unit 122 comprises a reflective illumination 124 and a transmissive illumination 126. The reading system 100 shown in FIG. 2 corresponds to the reading section 20 shown in FIG. 1.

In a case where reading of a printed matter is performed using the imaging unit 40, appropriate illumination conditions are present depending on the correction of printing, the ink color, and the like. Then, it is necessary to set the illumination conditions for each condition and control the illumination. The reading system 100 acquires information on illumination control from the higher-level system 110 and controls the illumination unit 122 on the basis of the acquired information on illumination control.

The higher-level system 110 stores information on the state of each system, information on the ink color used for printing, and information on printing modes. The printing modes include a main printing mode, a correction mode, and an inspection mode.

The main printing mode is a mode in which a printed matter as a product is generated. The correction mode is a mode in which various corrections of printing such as abnormal nozzle correction and printing unevenness correction are performed. The inspection mode is a mode in which inspection of the state of the ink jet head is performed in a case where the correction is performed. In the inspection mode, an inspection pattern such as a nozzle check pattern is generated on the base material.

The reading control unit 120 acquires inspection information on the inspection transmitted from the higher-level system 110 and controls the imaging unit 40 and the illumination unit 122 on the basis of the acquired inspection information.

In addition, the reading control unit 120 shown in the embodiment corresponds to an example of an inspection information acquisition section. Additionally, the reading control unit 120 shown in the embodiment corresponds to an example of an illumination control section. Moreover, the illumination unit shown in the embodiment corresponds to an example of an illumination section. Moreover, the inspection information shown in the embodiment corresponds to an example of inspection information on the inspection performed with respect to the printed matter.

The reading control unit 120 acquires the inspection information transmitted from the higher-level system 110 and controls the imaging unit 40 on the basis of the acquired inspection information to perform the reading of a printed matter. The printed matter represents a base material on which an image is formed using the printing system. The term image may include both an image as a product and an image such as a test pattern other than the product.

The reading control unit 120 transmits the read image or the like acquired by using the imaging unit 40 to the higher-level system 110. The reading control unit 120 may transmit a signal indicating the state of the reading system 100 to the higher-level system 110.

The reading control unit 120 sets the illumination conditions of the illumination unit 122 by collating the acquired inspection information with preset determination criteria. The reading control unit 120 controls the reflective illumination 124 and the transmissive illumination 126 on the basis of the set illumination conditions. A control example of the reflective illumination 124 includes the control of the emission intensity of the reflective illumination 124. Additionally, a control example of the transmissive illumination 126 includes the control of the emission intensity of the transmissive illumination 126.

The reading control unit 120 controls the reading device 24A and the illumination device 24B of the inspection section 24 shown in FIG. 1 on the basis of the information of the main printing mode transmitted from the higher-level system 110. That is, the reading control unit 120 controls the illumination device 24B that radiates the illumination light from the side of the non-printing surface of the printed matter 24C in a case where the inspection of the printed matter 24C performed in the main printing mode is performed.

Additionally, the reading control unit 120 controls the reading device 24A that reads the transmitted light of the printed matter 24C on the printing surface side of the printed matter 24C in a case where the inspection of the printed matter 24C is performed. In addition, information on the effect that the inspection of the printed matter is performed, which is included in the information of the main printing mode in the embodiment, corresponds to an example of the inspection information on the inspection to be performed with respect to the printed matter. Additionally, the printing surface of the printed matter 24C corresponds to an example of one surface of the base material. Moreover, the non-printing surface of the printed matter 24C corresponds to an example of the other surface of the base material.

[Printing System]

The printing system 102 comprises a printing control unit 130 and a printing unit 132. The printing unit 132 comprises an ink jet head 30. In addition, an ink jet head 30 shown in FIG. 2 represents any one of the ink jet head 30C, the ink jet head 30M, the ink jet head 30Y, or the ink jet head 30K shown in FIG. 1.

The printing control unit 130 acquires printing requests, printing mode information, printing parameters, and the like transmitted from the higher-level system 110 and controls the printing unit 132 by using the acquired printing parameters depending on the acquired printing requests and printing mode information.

That is, the printing control unit 130 performs jetting control of the ink jet head 30 on the basis of the dot data representing the dot position and the dot size for each color. The printing control unit 130 may comprise an image processing part that performs processing such as color conversion processing, plate separation processing, and halftone processing for converting pixel value data of each color for each pixel into dot data for each color, and may convert the pixel value data of each color for each pixel acquired from the higher-level system 110 into dot data for each color. The printing control unit 130 may acquire the dot data for each color from the higher-level system 110.

Additionally, in a case where the printing control unit 130 acquires the inspection mode information, the printing unit 132 is used to generate a test image such as a nozzle check pattern and a density patch on the base material or the like.

The printing control unit 130 transmits a response to a printing request, a signal indicating the state of the printing system 102, and the like to the higher-level system 110.

[Maintenance System]

The maintenance system 104 comprises a maintenance control unit 140 and a maintenance unit 142. The maintenance control unit 140 acquires a maintenance request transmitted from the higher-level system 110 and controls the maintenance unit 142 depending on the acquired maintenance request.

The maintenance unit 142 performs the maintenance of the ink jet head 30. Examples of the maintenance of the ink jet head 30 include purging, suction, wiping and the like. That is, the maintenance unit 142 comprises a cap and a wiping member. Additionally, the cap is connected to a suction pump via a flow channel. In addition, illustration of the cap and the like is omitted.

The maintenance control unit 140 transmits a response to the maintenance request, a signal indicating the state of the maintenance system 104, and the like to the higher-level system 110.

[Drying System]

The drying system 106 comprises a drying control unit 150 and a drying unit 152. The drying unit 152 is provided in the drying section 22 shown in FIG. 1. The drying control unit 150 acquires a drying treatment request transmitted from the higher-level system 110 and controls the drying unit 152 depending on the acquired drying treatment request. The drying control unit 150 may acquire the drying treatment parameters transmitted from the higher-level system 110 and control the drying unit 152 by using the acquired drying treatment parameters.

The drying control unit 150 transmits a response to the drying treatment request, a signal indicating the state of the drying system 106, and the like to the higher-level system 110.

[Transport System]

The transport system 108 comprises a transport control unit 160 and a transport unit 162. The transport unit 162 includes a drying transport part that transports a base material in the first intermediate transport part 14, the printing drum 32, the second intermediate transport part 18, the reading drum 42, and the drying section 22, which are shown in FIG. 1, and an inspection transport part that transports a base material in the inspection section 24.

The transport control unit 160 acquires a transport request transmitted from the higher-level system 110 and controls the transport control unit 160 depending on the acquired transport request. The transport control unit 160 may acquire transport parameters transmitted from the higher-level system 110 and control the transport unit 162 by using the acquired transport parameters.

The transport control unit 160 transmits a response to the transport request, a signal indicating the state of the transport control unit 160, and the like to the higher-level system 110. In addition, the printing drum 32 and a printing drum control part that controls the printing drum 32 shown in FIG. 1 may be components of the printing system 102. Additionally, a base material transport part and a base material transport control part that controls the base material transport part in the drying section 22 may be components of the drying system 106.

[Hardware Configuration of Control Unit]
[Overall Configuration]

Figure 3:
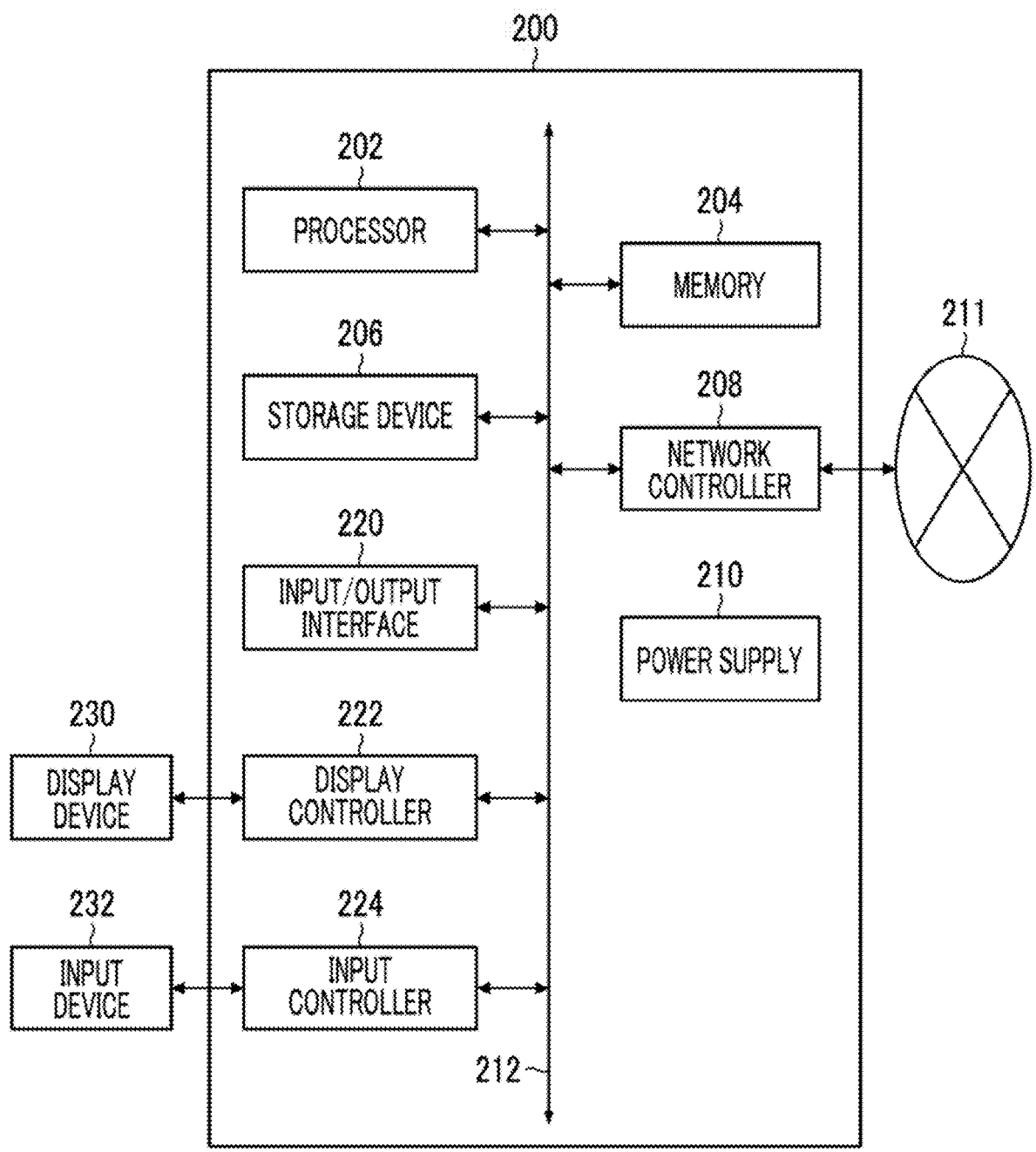
FIG. 3 is a block diagram showing a hardware configuration of a control unit.

FIG. 3 is a block diagram showing a hardware configuration of the control unit. A control unit 200 may execute a specified program by using the hardware shown in FIG. 3 to realize various functions. The control unit shown in FIG. 3 is applied to the reading control unit 120, the printing control unit 130, the maintenance control unit 140, the drying control unit 150, and the transport control unit 160, which are shown in FIG. 2. Additionally, the reading control unit 120 and the like may be configured as one control unit.

The control unit 200 comprises a processor 202, a memory 204, a storage device 206, a network controller 208, and a power supply 210. Additionally, the control unit 200 comprises an input/output interface 220, a display controller 222, and an input controller 224.

The processor 202, the memory 204, the storage device 206, the network controller 208, the input/output interface 220, the display controller 222, and the input controller 224 are connected to each other so as to be capable of data communication via a bus 212.

[Processor]

The processor 202 functions as an overall control part, various calculation parts, and a storage control part of the control unit 200. The processor 202 executes a program stored in a read only memory (ROM) provided in the memory 204.

The processor 202 may execute a program downloaded from an external storage device via network controller 208. The external storage device may be communicably connected to the control unit 200 via a network 211.

The processor 202 uses a random access memory (RAM) provided in the memory 204 as a calculation region and executes various processing in cooperation with various programs. Accordingly, various functions of the control unit 200 are realized.

The processor 202 controls the reading of data from the storage device 206 and the writing of data to the storage device 206. The processor 202 may acquire various data from the external storage device via the network controller 208. The processor 202 can execute various processing such as calculation using the acquired various data.

The processor 202 may include one, two or more devices. Examples of the processor 202 include a field programmable gate array (FPGA) and a programmable logic device (PLD). FPGAs and PLDs are devices whose circuit configurations may be changed after manufacturing.

Another example of the processor 202 includes an application specific integrated circuit (ASIC). The ASIC comprises a circuit configuration exclusively designed to execute specific processing.

Two or more same types of devices may be applied as the processor 202. For example, two or more FPGAs or two or more PLDs may be used as the processor 202. Two or more different types of devices may be applied as the processor 202. For example, one or more FPGAs and one or more ASICs may be applied as the processor 202.

In a case where a plurality of the processors 202 are provided, the plurality of processors 202 may be configured by using one device. As an example in which the plurality of processors 202 is configured by one device, there is a form in which one processor is configured using a combination of one or more central processing units (CPUs) and software, and the processor function as the plurality of processors 202. In addition, software in the present specification is synonymous with a program.

Instead of the CPU or in combination with the CPU, a graphics processing unit (GPU) that is a device specialized for image processing may be applied. A typical example in which the plurality of processors 202 are configured by using one device includes a computer.

Another example in which the plurality of processors 202 is configured by one device includes a form in which a device that realizes the functions of the entire system including the plurality of processors 202 with a single IC chip is used. A typical example of a device that realizes the functions of the entire system including the plurality of processors 202 with a single IC chip includes a system on chip (SoC). In addition, IC is an abbreviation for Integrated Circuit.

In this way, the processor 202 is configured by using one or more various devices as a hardware structure.

[Memory]

The memory 204 comprises a ROM (not shown) and a RAM (not shown). The ROM stores various programs executed by the control unit 200. The ROM stores parameters, files, and the like used for executing the various programs. The RAM functions as a temporary storage region for data, a work region for the processor 202, and the like.

[Storage Device]

The storage device 206 stores various data non-temporarily. The storage device 206 may be externally attached to the outside of the control unit 200. A large-capacity semiconductor memory device may be applied instead of the storage device 206, or the large-capacity semiconductor memory device may be applied in combination with the storage device 206.

[Network Controller]

The network controller 208 controls data communication with an external device. The control of the data communication may include the management of traffic for the data communication. A publicly known network such as a local area network (LAN) may be applied as the network 211 connected via the network controller 208.

[Power Supply]

A large-capacity power supply such as an uninterruptible power supply (UPS) is applied as the power supply 210. The power supply 210 supplies electrical power to the control unit 200 in a case where a commercial power supply is cut off due to a power failure or the like.

[Input/Output Interface]

The input/output interface 220 communicably connects the control unit 200 to an external device. As the input/ output interface 220, a communication standard such as a universal serial bus (USB) may be applied.

[Display Controller]

The display controller 222 functions as a display driver that controls the display device 230 on the basis of a command signal transmitted from the processor 202.

[Input Controller]

The input controller 224 converts the format of a signal input by using the input device 232 into a format suitable for the processing of the control unit 200. The information input from the input device 232 via the input controller 224 is transmitted to each part via the processor 202.

In addition, the hardware configuration of the control unit 200 shown in FIG. 3 is an example, and additions, deletions, and changes can be appropriately made. Additionally, the same configuration as that of the control unit 200 shown in FIG. 3 may be applied as the higher-level system 110.

[Configuration Example of Ink Jet Head]

[Overall Configuration of Ink Jet Head]

Figure 4:
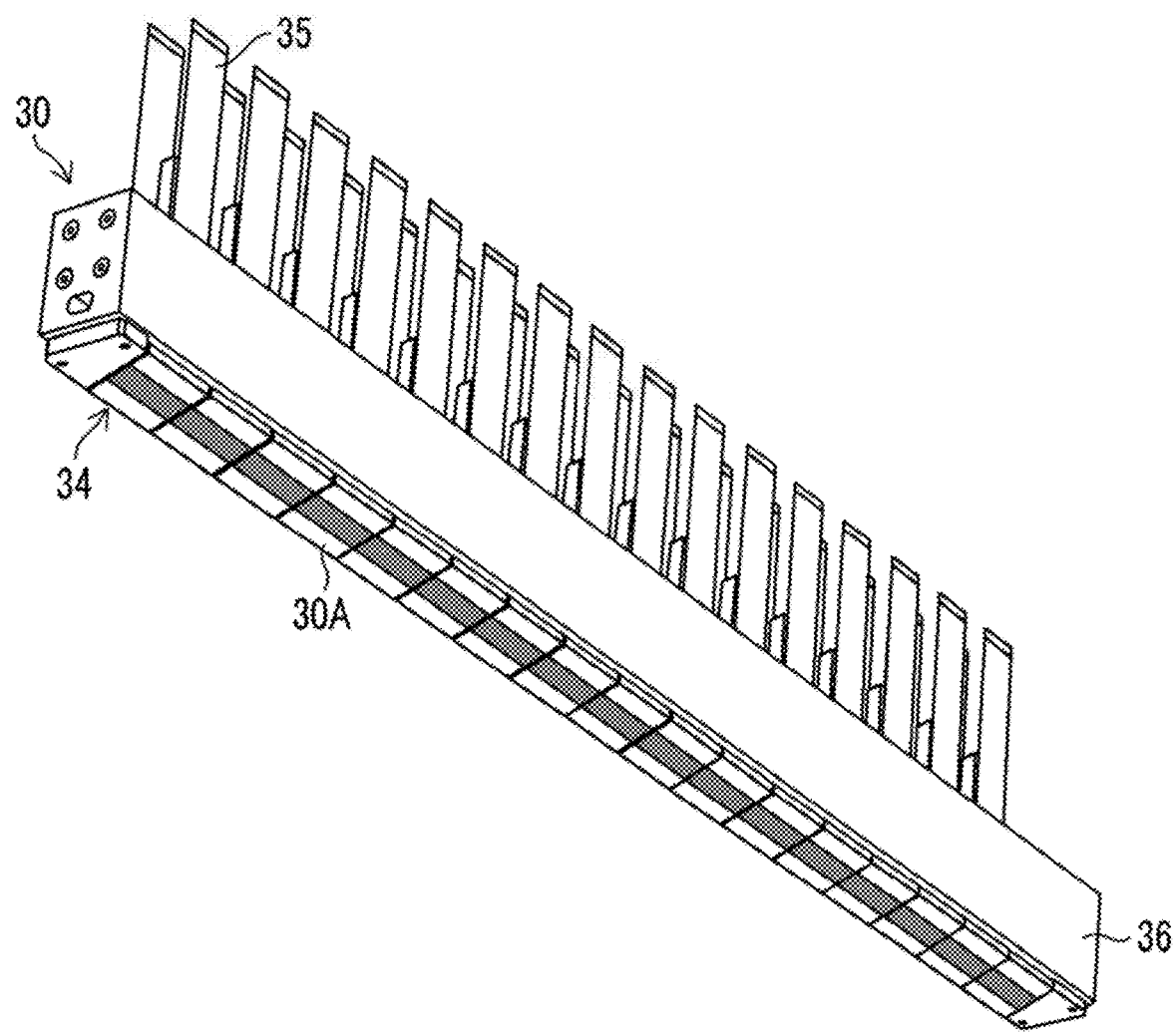
FIG. 4 is a perspective view illustrating a configuration of a distal end portion of an ink jet head.

FIG. 4 is a perspective view illustrating a configuration of a distal end portion of an ink jet head. The ink jet head 30 is a line type ink jet head having a nozzle line capable of performing image recording with a specified recording resolution by performing single scanning on the entire recording region of the base material in the width direction of the base material. Such an ink jet head is also referred to as a full line type ink jet head or a page wide head.

A distal end portion of the ink jet head 30 has a nozzle surface 30A. Nozzle openings of the nozzles that jet ink is formed in the nozzle surface 30A. The distal end portion of the ink jet head 30 includes the end of the ink jet head 30 on the side where ink is jetted.

The ink jet head 30 has a structure in which the plurality of head modules 34 are connected to each other in a line in a longitudinal direction. The head modules 34 are attached to and integrated with a support frame 36. An electrical connection cable 35 is connected to each head module 34.

[Nozzle Arrangement]

Figure 5:
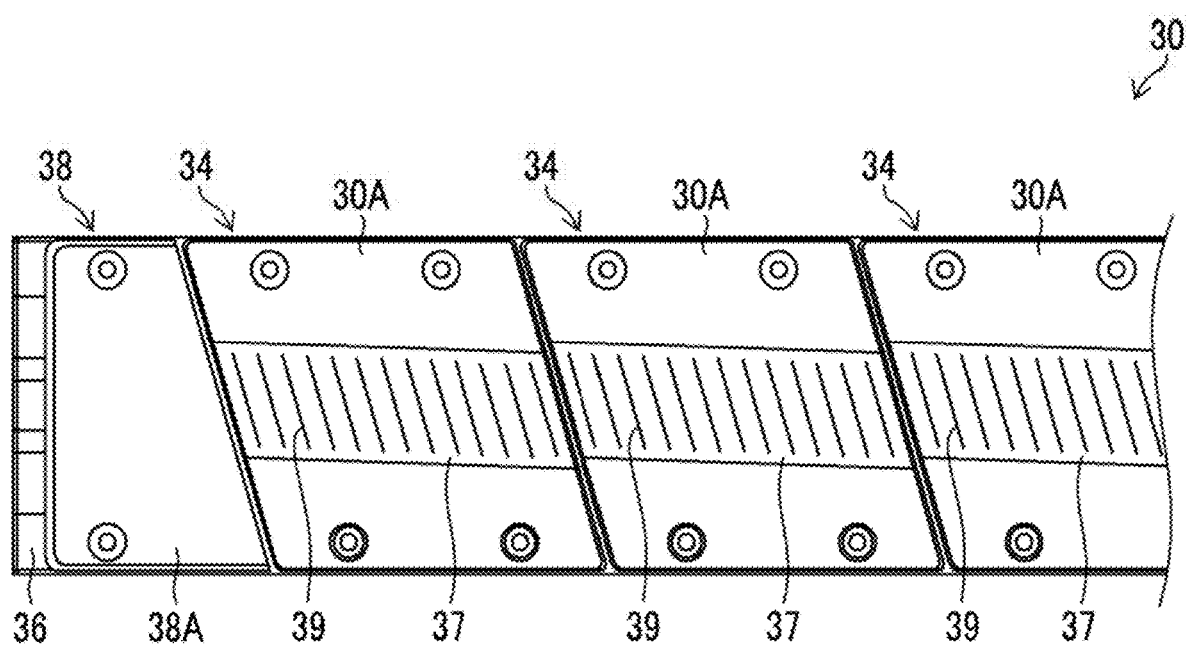
FIG. 5 is a partially enlarged view of a nozzle surface.

FIG. 5 is a partially enlarged view of the nozzle surface. The nozzle surface 30A of the head module 34 has a parallelogram shape. Dummy plates 38 are attached to both ends of the support frame 36. The nozzle surface 30A of the ink jet head 30 has an oblong shape as a whole together with a front surface 38A of the dummy plate 38.

A belt-shaped nozzle arrangement part 37 is provided at a central portion of the nozzle surface 30A of the head module 34. The nozzle arrangement part 37 functions as a substantial nozzle surface 30A. Nozzles are provided in the nozzle arrangement part 37. In addition, in FIG. 5, the nozzles are not shown individually, but nozzle lines 39 including a plurality of nozzles are shown.

Figure 6:
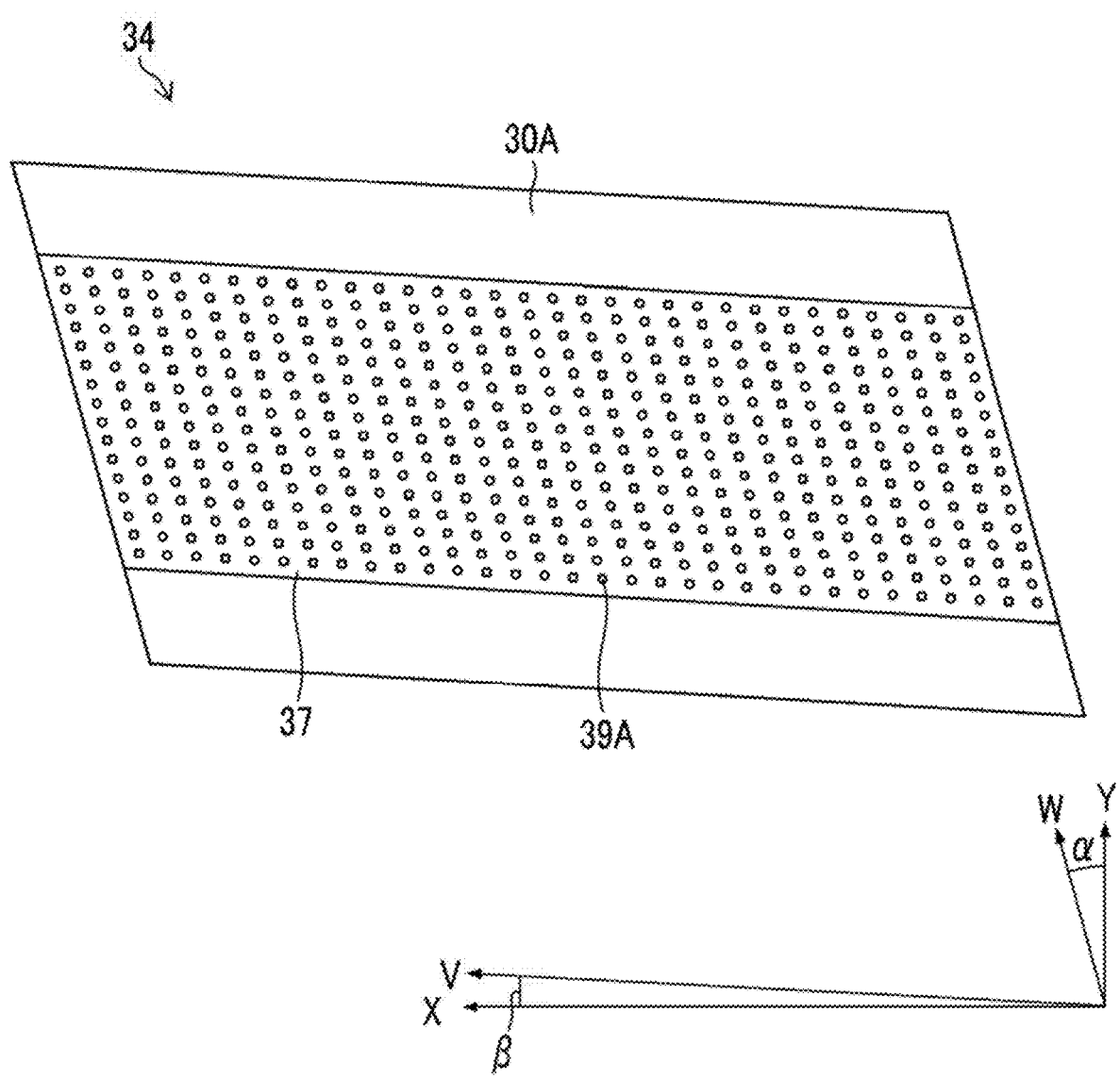
FIG. 6 is a plan view of a nozzle arrangement part

FIG. 6 is a plan view of the nozzle arrangement part. Reference sign Y represents the transport direction of the base material. Reference sign X represents the width direction of the base material. A two-dimensional arrangement is applied to the nozzle surface 30A of the head module 34 to arrange a plurality of nozzle openings 39A.

The head module 34 has a parallelogram planar shape having an end surface on a long side in a V direction having an inclination of an angle β with respect to the width direction of the base material and an end surface on a short side in a W direction having an inclination of an angle α with respect to the transport direction of the base material.

In the head module 34, the plurality of nozzle openings 39A are arranged in a matrix in a row direction along the V direction and a column direction along the W direction. The nozzle openings 39A may be arranged in a row direction along the width direction of the base material and a column direction obliquely intersecting the width direction of the base material.

In the case of the ink jet head in which the plurality of nozzles are arranged in a matrix, it can be considered that a projection nozzle line in which each nozzle in a matrix arrangement is projected in a nozzle line direction is equivalent to one nozzle line in which the respective nozzles are lined up at approximately regular intervals with a nozzle density such that a maximum recording resolution is achieved in the nozzle line direction. The projection nozzle line is a nozzle line in which each nozzle in a two-dimensional nozzle array is orthographically projected in the nozzle line direction.

The "approximately regular intervals" means that droplet striking points capable of being recorded in the ink jet printing apparatus 10 have substantially regular intervals. For example, even a case where a slightly different interval is included in consideration of at least one of manufacturing error or movement of liquid droplets on the base material due to landing interference is included in the concept of the regular intervals. The projection nozzle line corresponds to a substantial nozzle line. Considering the projection nozzle line, it is possible to associate each nozzle with a nozzle number indicating a nozzle position in line-up order of the projection nozzles lined up in the nozzle line direction.

The array form of the nozzles of the ink jet head 30 is not limited, and various nozzle array forms can be adopted. For example, instead of a matrix-shaped two-dimensional array form, a single-line linear array, a V-shaped nozzle array, and a polygonal-lined nozzle array such as a W-shaped array having a V-shaped array as a repeating unit are also available.

[Configuration Example of Ejector]

Figure 7:
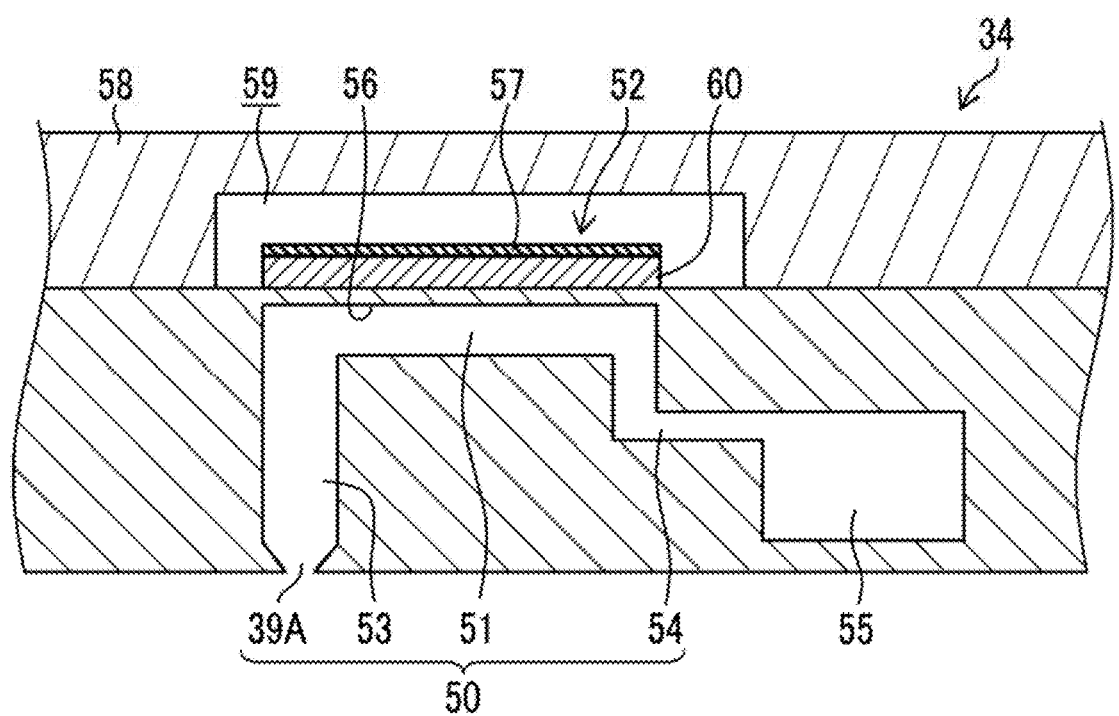
FIG. 7 is a longitudinal sectional view illustrating a three-dimensional structure of an ejector.

FIG. 7 is a longitudinal sectional view illustrating the three-dimensional structure of an ejector. The ejector 50 comprises a nozzle opening 39A, a pressure chamber 51 communicating with the nozzle opening 39A, and a piezoelectric element 52.

The nozzle opening 39A communicates with the pressure chamber 51 via a nozzle flow channel 53. The pressure chamber 51 communicates with a supply-side common branch flow channel 55 via an individual supply passage 54.

A vibration plate 56 that constitutes a top surface of the pressure chamber 51 comprises a conductive layer that functions as a common electrode corresponding to a lower electrode of the piezoelectric element 52. In addition, the illustration of the conductive layer is omitted. The pressure chamber 51, wall portions of the other flow channel portions, the vibration plate 56, and the like can be made of silicon.

The material of the vibration plate 56 is not limited to silicon, and an aspect is also possible in which the vibration plate is formed of a non-conductive material such as resin. The vibration plate 56 itself may be made of a metallic material such as stainless steel to serve as a common electrode.

A piezoelectric unimorph actuator is configured by a structure in which the piezoelectric element 52 is laminated on the vibration plate 56. A drive voltage is applied to an individual electrode 57, which is an upper electrode of the piezoelectric element 52, to deform a piezoelectric body 60, and the vibration plate 56 is bent to change the volume of the pressure chamber 51. A pressure change accompanying the volume change of the pressure chamber 51 acts on ink, and the ink is jetted from the nozzle opening 39A.

In a case where the piezoelectric element 52 returns to its original state after ink is jetted, the pressure chamber 51 is filled with new ink from the supply-side common branch flow channel 55 through the individual supply passage 54. The operation of filling the pressure chamber 51 with the ink is referred to as refilling.

The shape, in plan view, of the pressure chamber 51 is not particularly limited and may be various forms such as a quadrangular shape or other polygonal shapes, a circular shape, and an elliptical shape. A cover plate 58 shown in FIG. 7 is a member that keeps a movable space 59 of the piezoelectric element 52 and encapsulates the periphery of the piezoelectric element 52.

A supply-side ink chamber and a recovery-side ink chamber (not shown) are formed above the cover plate 58. The supply-side ink chamber is coupled to a supply-side common main flow channel (not shown) via a communication passage (not shown). The recovery-side ink chamber is coupled to a recovery-side common main flow channel (not shown) via a communication passage (not shown).

In addition, in the present embodiment, an aspect in which the line-type head is applied as the ink jet head 30 has been exemplified. However, a serial type may be applied to the ink jet head 30. Additionally, in the present embodiment, a piezo jet method has been exemplified as the jetting method of the ink jet head 30. However, other jetting methods such as a thermal method may be applied to the ink jet head 30.

[Configuration of Reading Section]

Figure 8:
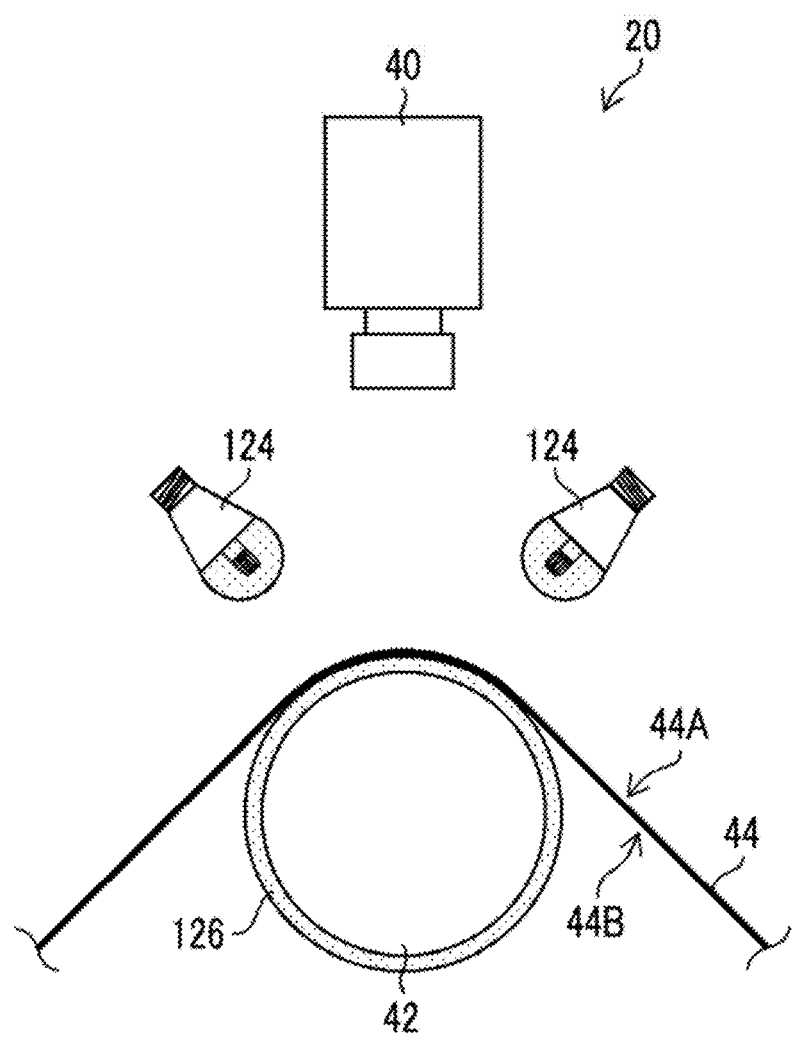
FIG. 8 is a schematic diagram showing a configuration example of a reading section.

FIG. 8 is a schematic diagram showing a configuration example of the reading section. The reading section 20 shown in the figure comprises the imaging unit 40, the reading drum 42, the reflective illumination 124, and the transmissive illumination 126. As the reflective illumination 124, any illumination device such as an LED illumination device may be applied. In addition, LED is an abbreviation for Light Emitting Diode.

The reflective illumination 124 is an illumination corresponding to the reflection system and is disposed at a position on a front surface 44A side of the base material 44. In other words, the reflective illumination 124 is disposed at a position on the same side as the imaging unit 40 with respect to the base material 44. In addition, the front surface 44A of the base material 44 shown in the embodiment corresponds to an example of one surface of the base material.

The transmissive illumination 126 is an illumination corresponding to a transmission system and is disposed at a position on a back surface 44B side of the base material 44. In other words, the transmissive illumination 126 is disposed at a position opposite to the imaging unit 40 with respect to the base material 44. In addition, the back surface 44B of the base material 44 shown in the embodiment corresponds to an example of the other surface of the base material.

As the transmissive illumination 126, a sheet illumination wound around a peripheral surface of the reading drum 42 may be applied. An example of the sheet illumination includes an inorganic EL sheet. Although FIG. 8 illustrates an aspect in which the sheet illumination is wound around the entire circumference of the reading drum 42 has been exemplified, the sheet illumination may be wound around a part of the reading drum 42. In addition, EL is an abbreviation for Electronic Luminescence.

In the present embodiment, an aspect in which the imaging unit 40 and the reflective illumination 124 are provided on the front surface 44A side of the base material 44 and the transmissive illumination 126 is provided on the back surface 44B side of the base material 44 has been exemplified. However, the transmissive illumination 126 may be provided on the front surface 44A side of the base material 44, and the imaging unit 40 and the reflective illumination 124 may be provided on the back surface 44B side of the base material 44.

[Procedure of Reading Method]

Figure 9:
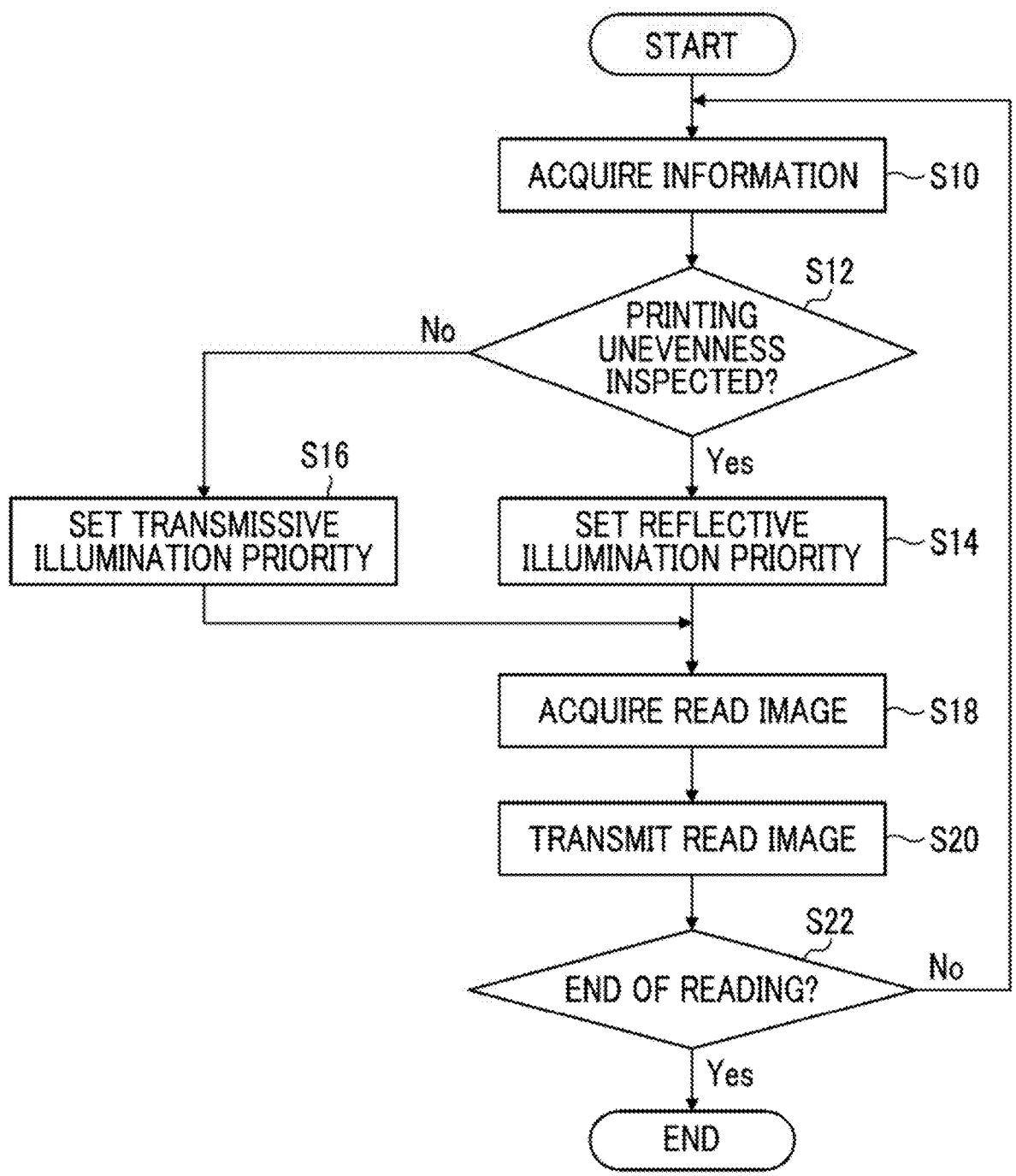
FIG. 9 is a flowchart showing a procedure of a reading method according to an embodiment.

FIG. 9 is a flowchart showing a procedure of a reading method according to the embodiment. FIG. 9 shows a reading method in which different illumination settings are performed depending on whether the inspection based on the basis of the read image is a printing unevenness inspection or an abnormal nozzle inspection. The printing unevenness inspection may include the inspection of the density unevenness and the inspection of color. The abnormal nozzle inspection may include the presence or absence of ink jetting for each nozzle, the error measurement of the ink landing position for each nozzle, and the error measurement of the dot size for each nozzle.

First, in an information acquisition step S10, the reading control unit 120 shown in FIG. 2 acquires the inspection information and the like from the higher-level system 110. After the information acquisition step S10, the process proceeds to an information determination step S12. In addition, the information acquisition step S10 shown in the embodiment corresponds to an example of an inspection information acquisition step.

In the information determination step S12, the reading control unit 120 determines whether the inspection information represents the performance of the printing unevenness inspection or the performance of the abnormal nozzle inspection. In addition, the abnormal nozzle inspection shown in the embodiment corresponds to an example of a printing element abnormality inspection.

In a case where it is determined in the information determination step S12 that the information acquired by the reading control unit 120 represents the printing unevenness inspection, a Yes determination is made, and the process proceeds to a reflective illumination priority setting step S14. On the other hand, in a case where the reading control unit 120 determines in the information determination step S12 that the inspection information represents the abnormal nozzle inspection, a No determination is made, and the process proceeds to a transmissive illumination priority setting step S16.

In the reflective illumination priority setting step S14, the reading control unit 120 sets the illumination conditions in which priority is given to the reflective illumination 124. Examples of the illumination conditions in which priority is given to the reflective illumination 124 include illumination conditions in which the reflective illumination 124 is turned on and the transmissive illumination 126 is turned off. After the reflective illumination priority setting step S14, the process proceeds to a read image acquisition step S18.

In the transmissive illumination priority setting step S16, the reading control unit 120 sets the illumination conditions in which priority is given to the transmissive illumination 126. Examples of the illumination conditions in which priority is given the transmissive illumination 126 include illumination conditions in which the reflective illumination 124 is turned off and the transmissive illumination 126 is turned on. After the transmissive illumination priority setting step S16, the process proceeds to the read image acquisition step S18.

In the read image acquisition step S18, the reading control unit 120 controls the illumination unit 122 on the basis of the set illumination conditions and controls the imaging unit 40 on the basis of the acquired information to perform the reading of the printed matter printed in a printing step.

In addition, the read image acquisition step S18 shown in the embodiment corresponds to an example of a reading step. Additionally, the control of the illumination unit 122 in the read image acquisition step S18 shown in the embodiment corresponds to an example of an illumination step of irradiating the base material with illumination light by using at least one of the reflective illumination part or the transmissive illumination part.

In the read image acquisition step S18, the reading control unit 120 stores the read image of the printed matter acquired by using the imaging unit 40. After the read image acquisition step S18, the process proceeds to a read image transmission step S20.

In the read image transmission step S20, the reading control unit 120 transmits the read image to the higher-level system 110. In the read image transmission step S20, the reading control unit 120 may transmit accessory information of the read image to the higher-level system 110. After the read image transmission step S20, the process proceeds to an end determination step S22.

In the end determination step S22, the reading control unit 120 determines whether or not to end the reading of the printed matter. In a case where it is determined in the end determination step S22 that the reading control unit 120 continues reading the printed matter, a No determination is made, and the process proceeds to an information acquisition step S10. The reading control unit 120 repeatedly executes the respective steps from the information acquisition step S10 to the end determination step S22 until a Yes determination is made in the end determination step S22.

On the other hand, in the end determination step S22, in a case where the reading control unit 120 determines that the reading of the printed matter is ended, a Yes determination is made, and the reading control unit 120 performs a specified end processing and ends the reading of the printed matter.

The higher-level system 110 that has acquired the read image of the printed matter performs a specified inspection. The higher-level system 110 transmits various correction information to the printing system 102 on the basis of the inspection result. The printing system 102 may acquire the various correction information transmitted from the higher-level system 110 and perform various corrections on the basis of the acquired correction information.

[Specific Example of Reading Printed Matter]

Figure 10:
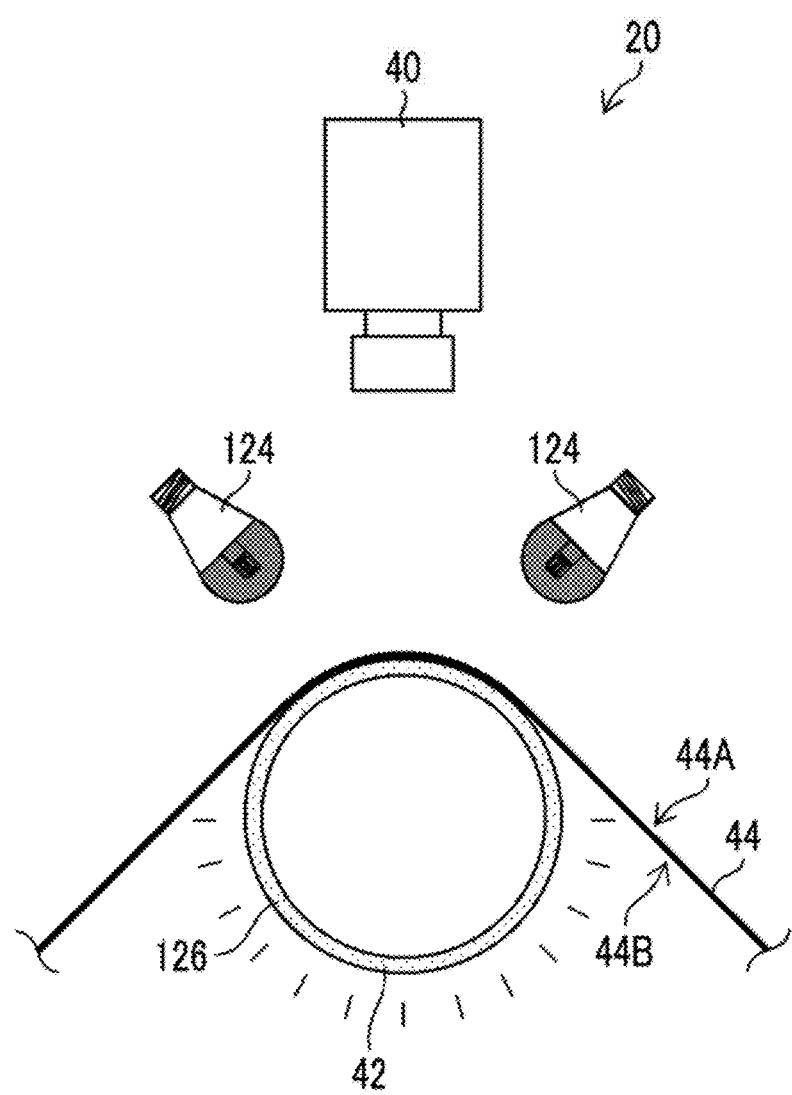
FIG. 10 is a schematic diagram of reading a printed matter using a transmissive illumination part.

FIG. 10 is a schematic diagram of reading a printed matter using a transmissive illumination part. The reading section 20 shown in FIG. 10 turns off the reflective illumination 124 and turns on the transmissive illumination 126. Accordingly, the transmitted light transmitted through the base material 44 is incident on the imaging unit 40.

Figure 11:
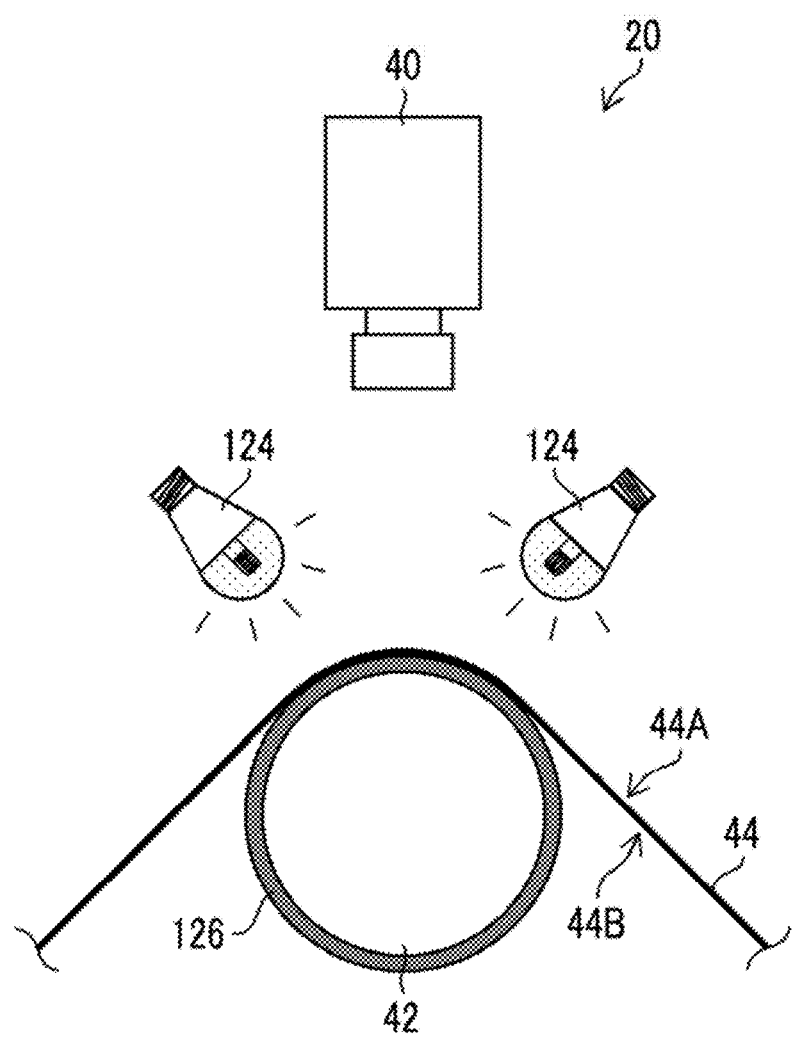
FIG. 11 is a schematic diagram of reading a printed matter using a reflective illumination part.

FIG. 11 is a schematic diagram of the reading of a printed matter using the reflective illumination part. The reading section 20 shown in FIG. 11 turns on the reflective illumination 124 and turns off the transmissive illumination 126. Accordingly, the reflected light reflected from the base material 44 is incident on the imaging unit 40.

That is, the ink jet printing apparatus 10 comprises the reflective illumination 124 corresponding to the reflection system, the transmissive illumination 126 corresponding to the transmission system, and the reading control unit 120. The reading drum 42 and the transmissive illumination 126 to which the sheet illumination is applied to the reading section 20 have been exemplified in FIG. 10. However, as long as the basic concept is the same, the reading section 20 is not limited to the configuration shown in FIG. 10 and the like.

Depending on the type of inspection of the printed matter, there is a case where it is different whether the reading of the printed matter using the reflective illumination 124 is suitable or whether the reading of the printed matter using the transmissive illumination 126 is suitable. For example, using the transmissive illumination 126 is suitable for the reading of the printed matter in the abnormal nozzle inspection. On the other hand, using the reflective illumination 124 is suitable for the reading of the printed matter in the printing unevenness inspection.

In the ink jet printing apparatus 10 shown in the present embodiment, the illumination conditions are set such that the transmissive illumination 126 is used for the reading of the printed matter in the abnormal nozzle inspection and the reflective illumination 124 is used for the reading of the printed matter in the printing unevenness inspection. The reading control unit 120 selectively controls the reflective illumination 124 and the transmissive illumination 126 depending on the set illumination conditions.

In addition, in a case where the reflective illumination 124 is used, the transmissive illumination 126 may be used in combination. Additionally, in a case where the transmissive illumination 126, the reflective illumination 124 may be used in combination. In a case where the transmissive illumination 126 is used in combination with the reflective illumination 124, the reflective illumination 124 may be 80 percent and the transmissive illumination 126 may be 20 percent of the total irradiation intensity with which the printed matter is irradiated. The same applies to the case where the reflective illumination 124 is used in combination with the transmissive illumination 126.

Considering the productivity and operability of the printed matter of the ink jet printing apparatus 10, it is necessary to perform switching of the illumination automatically and instantly. The sheet illumination wound around the reading drum 42 is applied to the transmissive illumination 126 shown in FIG. 10 and the like. The sheet illumination applied to the transmissive illumination 126 has a uniform milky white color during turn-off, and the milky white color on the front surface can be seen through the base material 44 in a case where the transparent base material 44 is supported.

That is, in a case where the reflective illumination 124 is turned on and the transmissive illumination 126 is turned off, the sheet illumination that is turned off serves as a substitute for the white background of the transparent base material 44 in a case where the printed matter is read using the reflective illumination 124. The color of the transmissive illumination 126 in a case where the transmissive illumination 126 is turned off may be a whitish color that can function as a background of the transparent base material 44, and for example, white and gray may be applied.

On the other hand, in a case where the reflective illumination 124 is turned off and the transmissive illumination 126 is turned on, the reading of the printed matter can be performed by using the transmissive illumination 126. Therefore, the switching between the reflective illumination 124 and the transmissive illumination 126 can be automatically and instantly performed without performing the movement of the reflective illumination 124 and the transmissive illumination 126 and the exchange of the background of the base material 44.

[Calibration of Imaging Unit]
[Overview of Calibration]

The imaging unit 40 shown in FIG. 10 or the like performs the calibration for correcting the sensitivity of each reading element. The calibration of the imaging unit 40 is performed in a case where the ink jet printing apparatus 10 is started.

The ink jet printing apparatus 10 uses the imaging unit 40 to read a reference region set on a reference surface of a reference member, and generates reading reference data for each reading element on the basis of the reading data of the imaging unit 40. The reading control unit 120 corrects the read image of the imaging unit 40 on the basis of the reading reference data. An example of the reading reference data includes a sensitivity correction coefficient for each reading element. Another example of the reading reference data includes a sensitivity correction function for each reading element.

In the calibration of the imaging unit 40, not only the variation in the sensitivity of each reading element of the imaging unit 40 but also the variation in the reflective illumination 124 and the variation in the transmissive illumination 126 are corrected.

Examples of the usage aspect of the illumination unit 122 include an aspect in which only the reflective illumination 124 is used and an aspect in which only the transmissive illumination 126 is used. An aspect in which both the reflective illumination 124 and the transmissive illumination 126 are used is also possible. In the aspect in which both the reflective illumination 124 and the transmissive illumination 126 are used, an aspect in which the reflective illumination 124 is used at 10 percent of the maximum emission intensity and the transmissive illumination 126 is used at 90 percent of the maximum emission intensity is also possible.

Since the illumination state differs depending on the usage aspect of the illumination unit 122, the ink jet printing apparatus 10 performs the calibration of the imaging unit 40 for each usage aspect of the illumination unit 122.

The ink jet printing apparatus 10 generates the reading reference data for each usage aspect of the illumination unit 122 and stores the reading reference data. That is, the ink jet printing apparatus 10 comprises a reading reference data creation section and a reading reference data storage section (not shown).

Additionally, the ink jet printing apparatus 10 has a reflection reference correction data creation section that creates reflection reference correction data that is reference correction data in a case where the reflective illumination 124 is used, and a transmission reference correction data creation section that creates transmission reference correction data that is reference correction data in a case where the transmissive illumination 126 is used. Moreover, the ink jet printing apparatus 10 comprises a reflection reference correction data storage section that stores the reflection reference correction data and a transmission reference correction data storage section that stores the transmission reference correction data.

[Reference Member Applied to Calibration]

Figure 12:
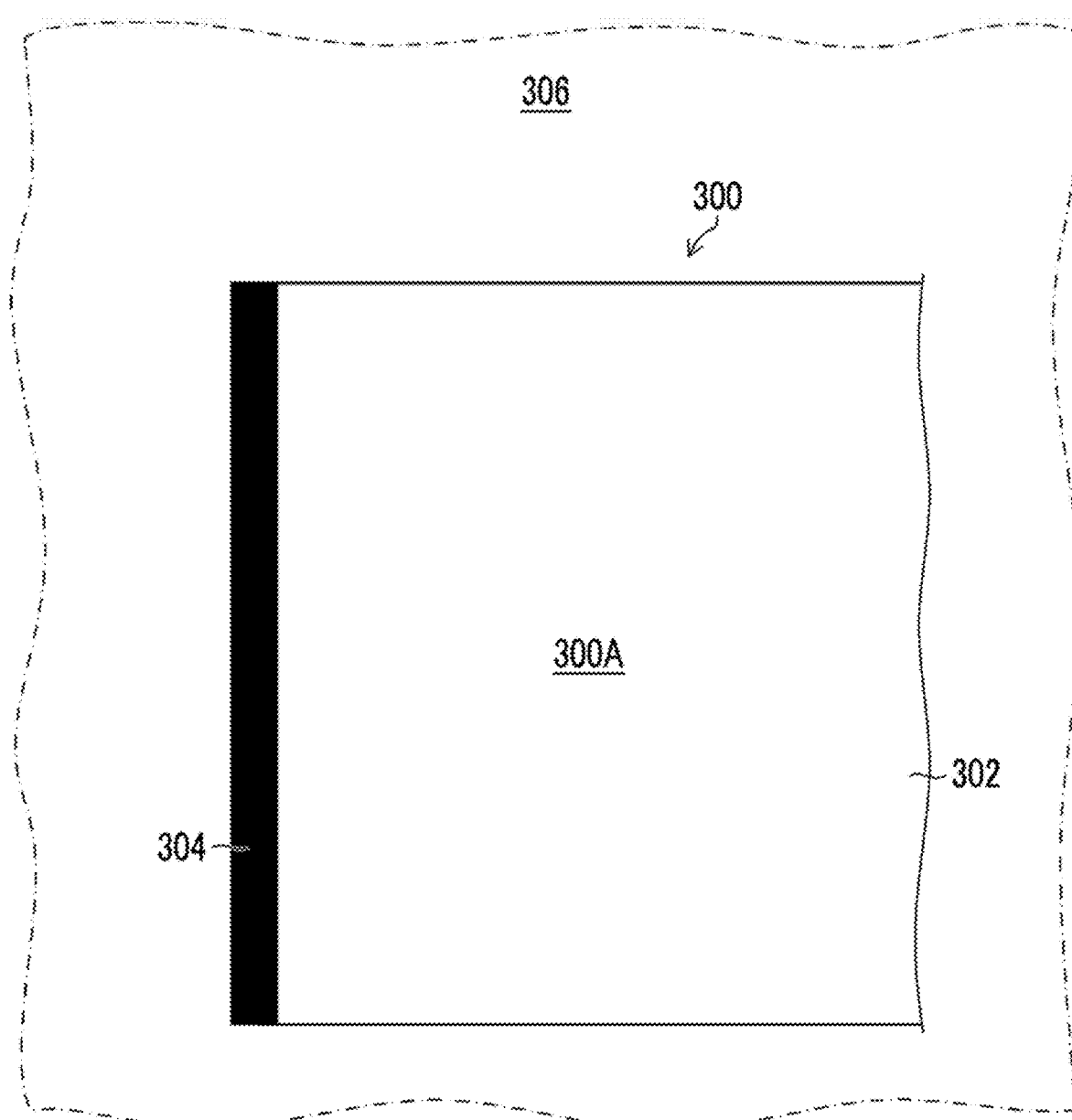
FIG. 12 is a plan view of a reference member applied to calibration.

FIG. 12 is a plan view of a reference member applied to the calibration. A reference member 300 shown in FIG. 12 is a plate-shaped member. The reference member 300 may be moved to the reading position of the imaging unit 40 in a case where the imaging unit 40 is calibrated, or may be disposed at any position on a transport route of the base material 44.

The reference member 300 comprises a reference region 302 and a pattern part 304 on a reference surface 300A read by the imaging unit 40. The reference region 302 is configured using white. The pattern part 304 is configured using black. Additionally, the pattern part 304 is disposed at one end of the reference member 300. The pattern part 304 functions as an index of the position of the end of the reference region 302 during the reading of the reference member 300 using the imaging unit 40. That is, the pattern part 304 functions as an index representing a boundary position between the reference member 300 and a background 306 of the reference member 300.

In addition, the color of the reference region is not limited to white. Any color may be applied as long as the reading reference data applied to the sensitivity correction of an imaging element provided in the imaging unit 40 can be generated. Additionally, the color of the pattern part 304 is not limited to black. Any color may be applied as long as the color of the pattern part 304 is a color that can be distinguished from the reference region 302 and the background 306.

The reference member 300 may be generated by applying a white resin sheet to the reference region 302 on the reference surface 300A and applying a black coating to the pattern part 304. As the material of a flat plate, metal, resin, and the like may be applied. The plane size of the reference member 300 is determined depending on the arrangement length and the like of the reading element in the imaging unit 40. Additionally, as the thickness of the reference member 300, a thickness that does not cause deformation such as deflection during reading using the imaging unit 40 is applied.

Figure 13:
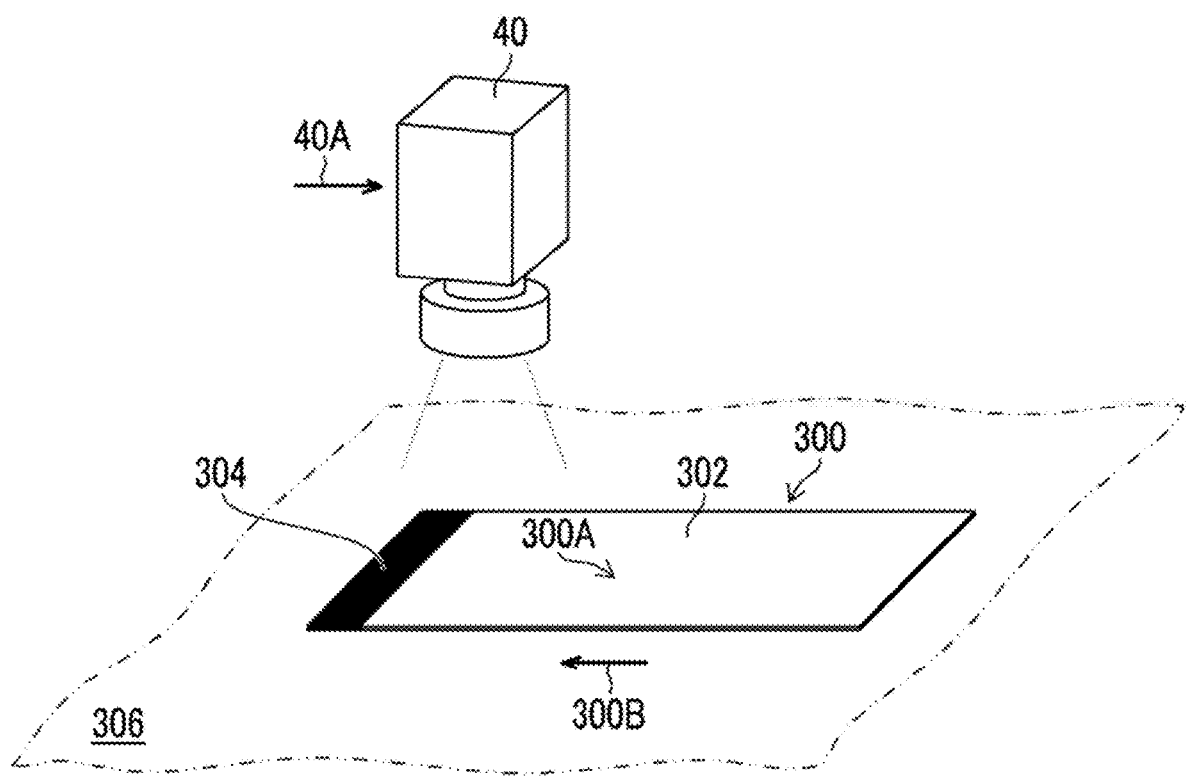
FIG. 13 is a schematic diagram of the calibration.

FIG. 13 is a schematic diagram of the calibration. The figure schematically shows a case where the imaging unit 40 and the reference member 300 are relatively moved and the reading of the reference surface 300A of the reference member 300 is performed by using the imaging unit 40.

Reference sign 40A shown in FIG. 13 represents a scanning direction of the imaging unit 40. Reference sign 300B represents a movement direction of the reference member 300. In the example shown in FIG. 13, the pattern part 304 functions as an index of a reading start position of the reference member 300.

[Modification Example of Reference Member]

Figure 14:
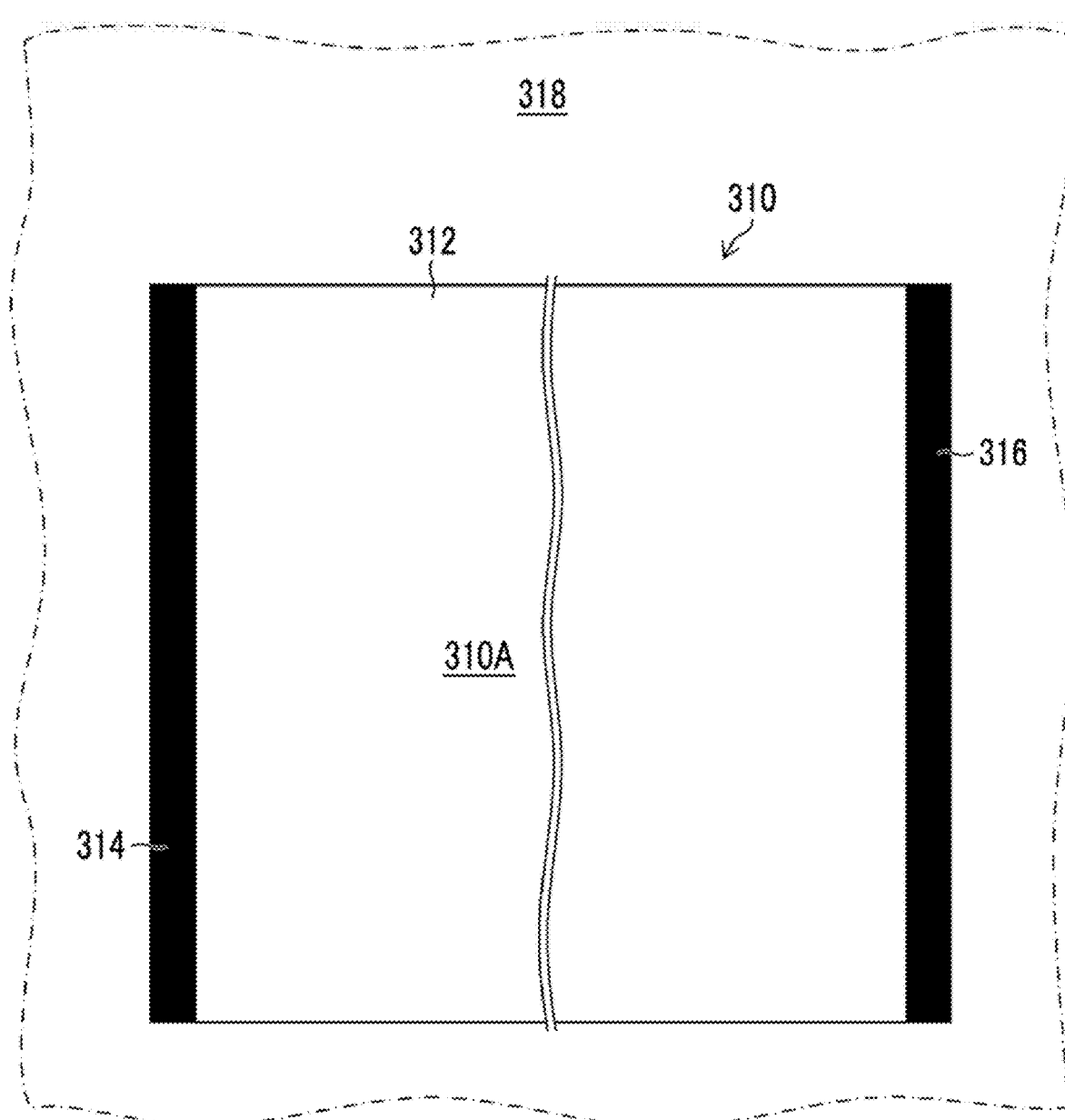
FIG. 14 is a plan view of a reference member according to a modification example.

FIG. 14 is a plan view of a reference member according to a modification example. The reference member 310 shown in the figure comprises a reference region 312, a first pattern part 314, and a second pattern part 316 on the reference surface 310A. That is, the reference member 310 comprises the first pattern part 314 at one end of the reference region 312 and the second pattern part 316 at the other end of the reference region 312. The reference region 312 shown in FIG. 14 may be generated similarly to the reference region 302 shown in FIG. 12. Additionally, the first pattern part 314 and the second pattern part 316 shown in FIG. 14 may be generated similarly to the pattern part 304 shown in FIG. 12.

Figure 15:
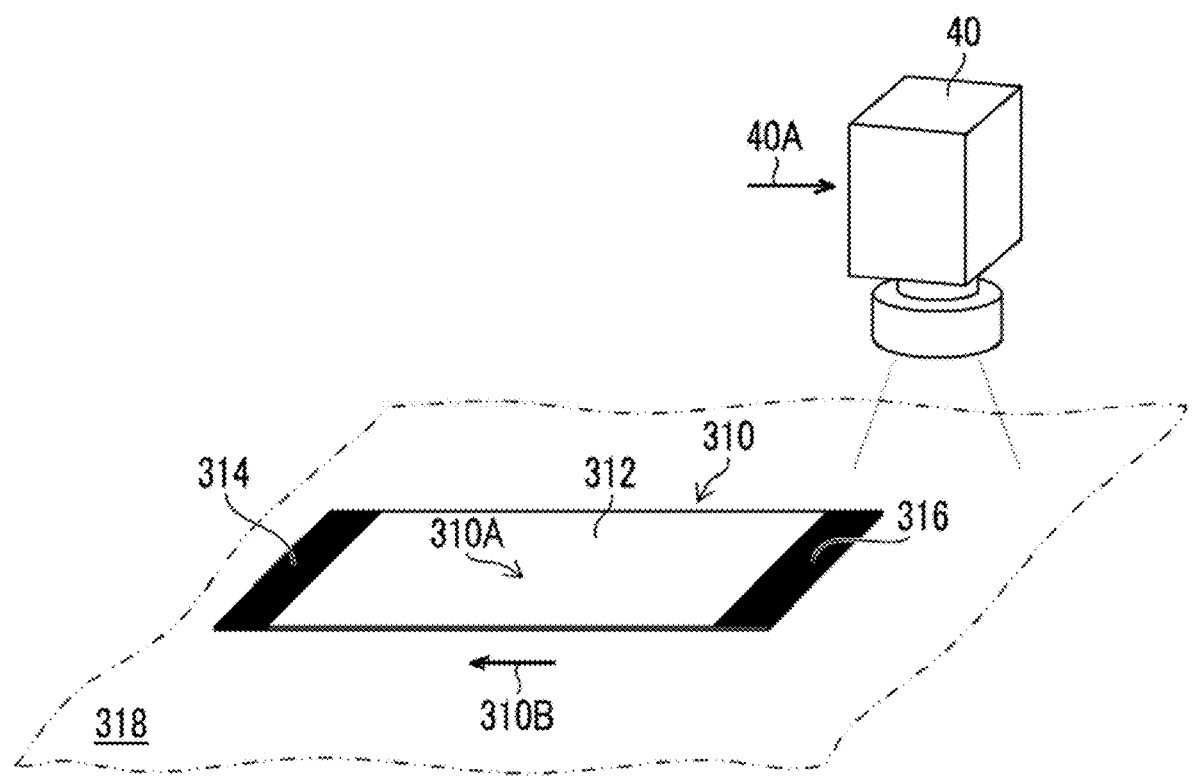
FIG. 15 is a schematic diagram of calibration using the reference member according to the modification example.

FIG. 15 is a schematic diagram of the calibration using the reference member according to the modification example. In FIG. 15, reference sign 310B represents a movement direction of the reference member 310. Additionally, reference sign 318 represents a background. In the example shown in FIG. 15, the first pattern part 314 functions as an index of the reading start position of the reference member 310, and the second pattern part 316 functions as an index of the reading end position of the reference member 310.

[Operational Effects]

According to the ink jet printing apparatus 10 and a printed matter reading method shown in the present embodiment, the following operational effects can be exhibited.

[1]

The reading control unit 120 controls the illumination unit 122 on the basis of at least one of the inspection information or the correction information transmitted from the higher-level system 110. Accordingly, optimal illumination conditions can be set for each type of inspection, and high-quality read images can be stably acquired.

[2]

In the case of the abnormal nozzle inspection, the transmissive illumination 126 is used. Accordingly, a high-quality read image suitable for the abnormal nozzle inspection can be stably acquired. Additionally, in the case of the printing unevenness inspection, the reflective illumination 124 is used. Accordingly, a high-quality read image suitable for the printing unevenness inspection can be stably acquired.

[3]

The reading control unit 120 controls the emission intensity of at least one of the reflective illumination 124 or the transmissive illumination 126. Accordingly, the illumination conditions suitable for reading the printed matter based on the inspection information can be set.

[4]

Calibration information is generated and stored for each illumination condition. Accordingly, the calibration of the reflective illumination 124 and the transmissive illumination 126 suitable for reading the printed matter can be performed for each illumination condition.

[5]

As the transmissive illumination 126, the sheet illumination wound around the peripheral surface of the reading drum 42 is applied. Accordingly, the configuration of the transmissive illumination 126 can be simplified, and the switching between the reflective illumination 124 and the transmissive illumination 126 can be automatically and instantly performed. Additionally, the color of the front surface of the sheet illumination during turn-off is milky white. Accordingly, the transmissive illumination 126 can serve as the background of the transparent base material 44 in reading the printed matter in a case where the reflective illumination 124 is turned on and the transmissive illumination 126 is turned off.

Modification Example

[To Cope with White Ink]

In a case where printing is performed on the transparent base material 44 using the white ink and in a case where the transmissive illumination 126 is turned off and the background of the base material 44 is milky white, it is difficult to discriminate the printing state of the white ink. Thus, in a case where the reading control unit 120 acquires the information that the white ink is used as information of the ink color, the reading control unit 120 performs the control of the illumination unit 122 that uses the transmissive illumination 126 without using the reflective illumination 124.

Additionally, the reading control unit 120 may turn on both the reflective illumination 124 and the transmissive illumination 126 to use the illumination unit 122 as a multi-illumination. Accordingly, by controlling the lighting state of the reflective illumination 124 and the transmissive illumination 126, the reading of the printed matter can be performed at high speed and stably.

[Control of Illumination Using Ink Color Information]

The reading control unit 120 can control the illumination unit 122 by using the ink color information transmitted from the higher-level system 110. The proportion of the irradiation intensity between the reflective illumination 124 and the transmissive illumination 126 is specified in advance for each ink color. For example, in a case where the reflective illumination 124 is turned on and the transmissive illumination 126 is turned off, the proportion of the irradiation intensity between the reflective illumination 124 and the transmissive illumination 126 is specified such that the reflective illumination is 100 percent and the transmissive illumination is 0 percent.

That is, the maximum irradiation intensity of the reflective illumination 124 is set to 100 percent, and the irradiation intensity in a case where the reflective illumination 124 is turned off is set to 0 percent. Additionally, the maximum irradiation intensity of the transmissive illumination 126 is set to 100 percent, and the irradiation intensity in a case where the transmissive illumination 126 is turned off is set to 0 percent. Moreover, the irradiation intensity proportion of the reflective illumination 124 and the irradiation intensity proportion of the transmissive illumination 126 are specified such that the sum of the irradiation intensity proportion of the reflective illumination 124 and the irradiation intensity proportion of the transmissive illumination 126 is 100 percent.

A control example of the irradiation intensity of the reflective illumination 124 is a control for adjusting the irradiation duty of the reflective illumination 124. The irradiation intensity of the transmissive illumination 126 can be controlled similarly to the irradiation intensity of the reflective illumination 124.

As an example of the illumination control using the ink color information, there is an example of switching between the illumination control in a case where the color ink such as cyan ink is used and the illumination control in a case where the white ink is used. The irradiation intensity proportion of the reflective illumination 124 and the irradiation intensity proportion of the transmissive illumination 126 are specified and stored in advance for each ink color. The specified irradiation intensity proportion of the reflective illumination 124 and the specified irradiation intensity proportion of the transmissive illumination 126 are set depending on the ink color information.

For example, in the case of the color ink, the reflective illumination 124 may be specified as 100 percent and the transmissive illumination 126 may be specified as 0 percent. Additionally, in the case of the white ink, the reflective illumination 124 may be specified as 20 percent, and the transmissive illumination 126 may be specified as 80 percent.

That is, in the inspection of the printing unevenness of the white ink, the reading of the printed matter printed using the white ink is performed with the reflective illumination 124 as 20 percent and the transmissive illumination 126 as 80 percent. Accordingly, a high-quality read image can be stably acquired for the printed matter using the white ink.

The illumination conditions can be initially set in a case where the device is shipped and automatically set depending on various conditions in a case where the device is operated. Additionally, in a case where the printing conditions are changed such as a printing image is changed, the illumination conditions may be automatically set or may be manually set.

Examples of the white ink include inks containing white pigments such as calcium carbonate, barium sulfate, and aluminum hydroxide. The white ink applied to the present embodiment may include ink sold as white ink and whitish ink by an ink manufacturer. Additionally, the color ink means a color ink excluding the white ink and the transparent ink. The transparent ink may include an ink referred to as clear ink or the like. In addition, the ink color information shown in the embodiment corresponds to an example of printing information. Additionally, the reading control unit 120 shown in the embodiment corresponds to an example of a printing information acquisition section.

[Example of Application to Program Invention]

It is possible to configure a program that allows a computer to realize the functions of the respective sections provided in the ink jet printing apparatus 10 shown in the present embodiment and the functions corresponding to the respective steps of the reading method.

As a function realized by the computer, there is a printing function of performs printing on the transparent base material 44. Other functions include an illumination function of performing at least one of the irradiation of illumination light from the reflective illumination 124 to the base material 44 or the irradiation of illumination light from the transmissive illumination 126 to the base material 44.

Additionally, another function includes a reading function that uses the imaging unit 40 to read at least one of the reflected light of the base material 44 radiated from the reflective illumination 124 or the transmitted light of the base material 44 radiated from the transmissive illumination 126.

Moreover, as another function, there is an inspection information acquisition function for acquiring the inspection information on the inspection performed on the printed matter. The illumination function controls the reflective illumination 124 and the transmissive illumination 126 on the basis of the inspection information acquired by using the inspection information acquisition function.

In the present embodiment, the ink jet type printing apparatus has been exemplified as the printing apparatus. However, the illumination control shown in the present embodiment can also be applied to a printing apparatus of an electrophotographic type or the like.

In the embodiment of the present invention described above, it is possible to appropriately change, add, or delete the configuration requirements without departing from the spirit of the present invention. The present invention is not limited to the embodiment described above, and many modifications can be made by a person having ordinary skill in the art within the technical idea of the present invention.

| Explanation of References |
| --- |
| 10: ink jet printing apparatus |
| 12: base material supply section |
| 14: first intermediate transport part |
| 16: printing section |
| 18: second intermediate transport part |
| 20: reading section |
| 22: drying section |
| 24: inspection section |
| 24A: reading device |
| 24B: illumination device |
| 26: stacking section |
| 30: ink jet head |
| 30C: ink jet head |
| 30M: ink jet head |
| 30Y: ink jet head |
| 30K: ink jet head |
| 32: printing drum |
| 34: head module |
| 35: electrical connection cable |
| 36: support frame |
| 37: nozzle arrangement part |

| Explanation of References |
| --- |
| 38: dummy plate |
| 38A: front surface |
| 39: nozzle line |
| 39A: nozzle opening |
| 40: imaging unit |
| 40A: scanning direction |
| 42: reading drum |
| 44: base material |
| 44A: front surface |
| 44B: back surface |
| 50: ejector |
| 51: pressure chamber |
| 52: piezoelectric element |
| 53: nozzle flow channel |
| 54: individual supply passage |
| 55: supply-side common branch flow channel |
| 56: vibration plate |
| 57: individual electrode |
| 58: cover plate |
| 59: movable space |
| 60: piezoelectric body |
| 100: reading system |
| 102: printing system |
| 104: maintenance system |
| 106: drying system |
| 108: transport system |
| 110: higher-level system |
| 120: reading control unit |
| 122: illumination unit |
| 124: reflective illumination |
| 126: transmissive illumination |
| 130: printing control unit |
| 132: printing unit |
| 140: maintenance control unit |
| 142: maintenance unit |
| 150: drying control unit |
| 152: drying unit |
| 160: transport control unit |
| 162: transport unit |
| 200: control unit |
| 202: processor |
| 204: memory |
| 206: storage device |
| 208: network controller |
| 210: power supply |
| 211: network |
| 212: bus |
| 220: input/output interface |
| 222: display controller |
| 224: input controller |
| 230: display device |
| 232: input device |
| 300: reference member |
| 300A: reference surface |
| 300B: movement direction |
| 302: reference region |
| 304: pattern part |
| 306: background |
| 310: reference member |
| 310A: reference surface |
| 310B: movement direction |
| 312: reference region |
| 314: first pattern part |
| 316: second pattern part |
| 318: background |
| S10 to S22: respective steps of reading method |

What is claimed is:

1. A printing apparatus comprising:
a printing section that performs printing on a transparent base material to generate a printed matter;
an illumination section including a reflective illumination part that is disposed on one surface side of the base material and irradiates the base material with illumination light and a transmissive illumination part that is disposed on the other surface side of the base material and irradiates the base material with illumination light;

a reading section that is disposed on the one surface side of the base material and reads reflected light of the base material or transmitted light of the base material;

an inspection information acquisition section that acquires inspection information on an inspection performed on the printed matter; and an illumination control section that selectively controls at least one of the reflective illumination part or the transmissive illumination part on the basis of the inspection information acquired by using the inspection information acquisition section, wherein the illumination control section performs a control using at least the transmissive illumination part in a case where the inspection information indicating that a printing element abnormality inspection is performed is acquired.

2. The printing apparatus according to claim 1, wherein the illumination control section performs a control using at least the reflective illumination part in a case where the inspection information indicating that a printing unevenness inspection is performed is acquired.

3. The printing apparatus according to claim 1, wherein the illumination control section controls emission intensities of the reflective illumination part and of the transmissive illumination part.

4. The printing apparatus according to claim 1, further comprising:

a printing information acquisition section that acquires printing information on printing from a higher-level system, wherein the illumination control section controls the illumination section on the basis of the printing information.

5. The printing apparatus according to claim 4, wherein the printing information acquisition section acquires information on a color used for printing as the printing information.

6. The printing apparatus according to claim 1, further comprising:

a reading reference data creation section that reads a reference surface by using the reading section and creates reading reference data for the reading section;

a reference correction data creation section that creates reference correction data to be used in a case where a read image is corrected using the reading reference data; and a reference correction data storage section that stores the reference correction data, wherein the reference correction data creation section creates reflection reference correction data that is the reference correction data in a case where the reflective illumination part is used, and transmission reference correction data that is the reference correction data in a case where the transmissive illumination part is used, and wherein the reference correction data storage section stores the reflection reference correction data and the transmission reference correction data.

7. The printing apparatus according to claim 1, wherein a sheet illumination provided on a surface that supports the base material in a case where the base material is transported is applied to the transmissive illumination part.

8. The printing apparatus according to claim 7, wherein a color of the surface that supports the base material in a case where the sheet illumination is turned off is a whitish color.

9. A reading method comprising:

a printing step of performing printing on a transparent base material to generate printed matter;

an illumination step of irradiating the base material with illumination light by using a reflective illumination part disposed on one surface side of the base material and a transmissive illumination part disposed on the other surface side of the base material;

a reading step of reading reflected light of the base material or transmitted light of the base material by using a reading section disposed on the one surface side of the base material; and an inspection information acquisition step of acquiring inspection information on an inspection performed on the printed matter, wherein the illumination step irradiates the base material with illumination light by selectively using at least one of the reflective illumination part or the transmissive illumination part on the basis of the inspection information acquired in the inspection information acquisition step, wherein the illumination step irradiates the base material with illumination light by using at least the transmissive illumination part in a case where the inspection information indicating that a printing element abnormality inspection is performed is acquired in the inspection information acquisition step.

10. The method according to claim 9, wherein the illumination step irradiates the base material with illumination light by using at least the reflective illumination part in a case where the inspection information indicating that a printing unevenness inspection is performed is acquired in the inspection information acquisition step.

11. A non-temporary and computer-readable storage medium for causing a computer to execute, in a case where a command stored in the storage medium is read by the computer, a printing function of performing printing on a transparent base material to generate a printed matter;

an illumination function of irradiating the base material with illumination light by using at least one of a reflective illumination part disposed on one surface side of the base material or a transmissive illumination part disposed on the other surface side of the base material;

a reading function of reading reflected light of the base material or transmitted light of the base material by using a reading section disposed on the one surface side of the base material; and an inspection information acquisition function of acquiring inspection information on an inspection performed on the printed matter, wherein the illumination function irradiates the base material with illumination light by selectively using at least one of the reflective illumination part or the transmissive illumination part on the basis of the inspection information acquired by using the inspection information acquisition function, wherein the illumination function irradiates the base material with illumination light by wherein the illumination function irradiates the base material with illumination light by using at least the transmissive illumination part in a case where the inspection information indicating that a printing element abnormality inspection is performed is acquired by using the inspection information acquisition function.

12. The storage medium according to claim 11, wherein the illumination function irradiates the base material with illumination light by using at least the reflective illumination part in a case where the inspection information indicating that a printing unevenness inspection is performed is acquired by using the inspection information acquisition function.

* * * * *